US010204646B2

(12) United States Patent
Matsumoto

(10) Patent No.: US 10,204,646 B2
(45) Date of Patent: Feb. 12, 2019

(54) NEAR-FIELD TRANSDUCER WITH ADJACENT HIGH-REFRACTIVE INDEX MATERIAL LAYER

(71) Applicant: HGST Netherlands B.V., Amsterdam (NL)

(72) Inventor: Takuya Matsumoto, Sunnyvale, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 15/146,791

(22) Filed: May 4, 2016

(65) Prior Publication Data

US 2017/0323659 A1 Nov. 9, 2017

(51) Int. Cl.
G11B 5/265 (2006.01)
G11B 5/31 (2006.01)
G11B 5/60 (2006.01)
G11B 5/00 (2006.01)
G11B 5/40 (2006.01)

(52) U.S. Cl.
CPC ............ *G11B 5/314* (2013.01); *G11B 5/3116* (2013.01); *G11B 5/3133* (2013.01); *G11B 5/6088* (2013.01); *G11B 5/40* (2013.01); *G11B 2005/0021* (2013.01)

(58) Field of Classification Search
None
See application file for complete search history.

(56) References Cited

U.S. PATENT DOCUMENTS

| 8,351,151 | B2 | 1/2013 | Katine et al. |
| 8,385,159 | B2 | 2/2013 | Gao et al. |
| 8,619,516 | B1 | 12/2013 | Matsumoto |
| 8,873,352 | B1 | 10/2014 | Jandric et al. |
| 8,971,161 | B2 | 3/2015 | Cheng et al. |
| 2011/0096639 | A1 | 4/2011 | Matsumoto |
| 2011/0170381 | A1 | 7/2011 | Matsumoto |
| 2012/0084969 | A1* | 4/2012 | Tanaka ............... G11B 5/314 29/603.01 |
| 2013/0279310 | A1 | 10/2013 | Zhong et al. |
| 2015/0109892 | A1 | 4/2015 | Contreras et al. |
| 2015/0117170 | A1 | 4/2015 | Zhao |

OTHER PUBLICATIONS

Matsumoto, T. et al., "Integrated Head Design Using a Nanobeak Antenna for Thermally Assisted Magnetic Recording," Optics Express, vol. 20, No. 17, Aug. 13, 2012, Published Online Aug. 2, 2012, 9 pages.

* cited by examiner

*Primary Examiner* — Brian Butcher

(57) ABSTRACT

A heat assisted magnetic recording (HAMR) head has a near-field transducer (NFT) with a distal end having a leading side taper inclined at an acute angle to the ABS, such that an acute angle is formed between a leading surface of the leading side taper and the ABS. A main magnetic pole is disposed in the head facing a trailing side of the NFT. A waveguide core layer is disposed in the head facing the leading side taper of the NFT, on which a high refractive index material (HRIM) layer is positioned.

24 Claims, 31 Drawing Sheets

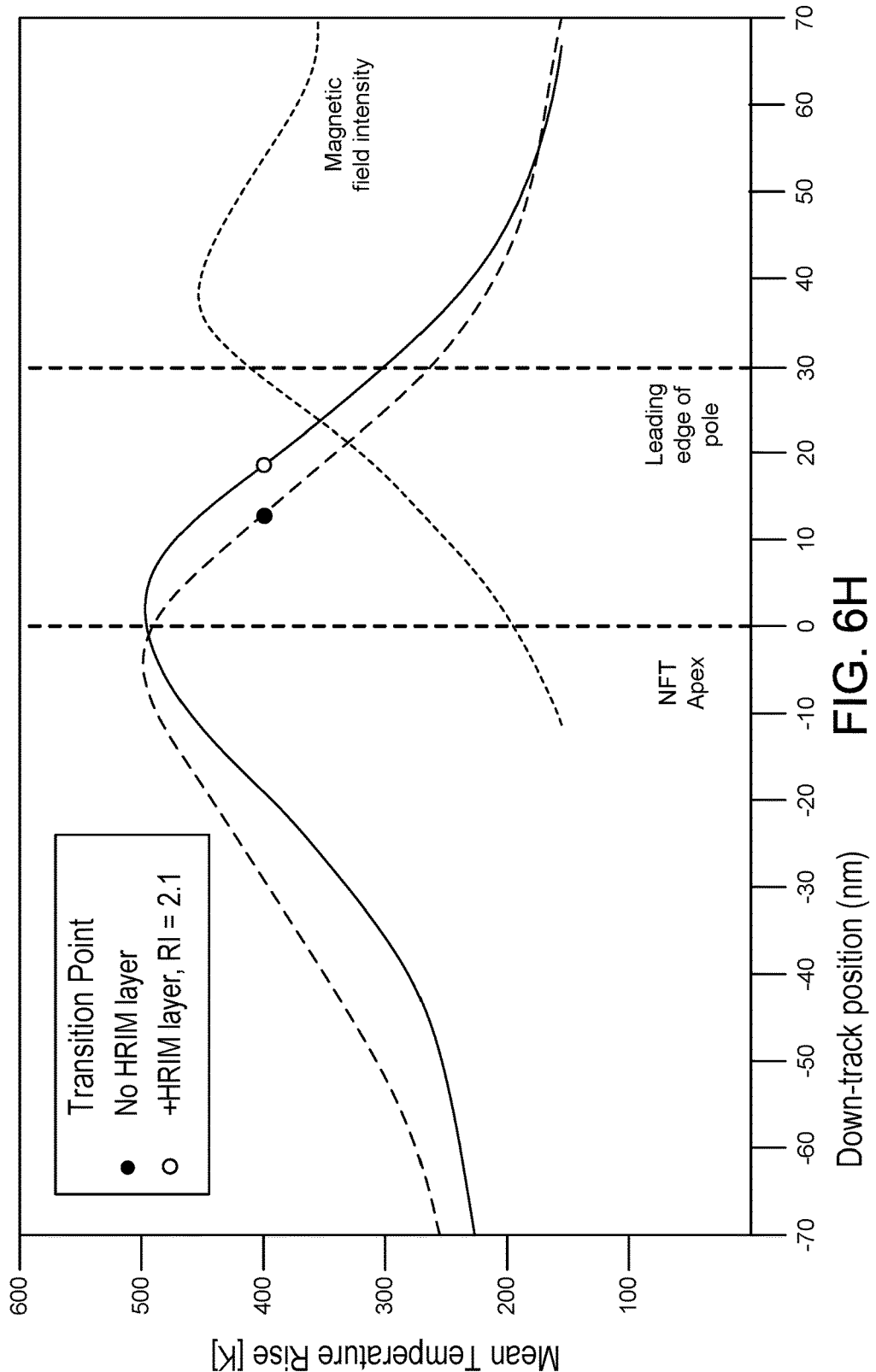

NEAR-FIELD TRANSDUCER WITH ADJACENT HIGH-REFRACTIVE INDEX MATERIAL LAYER

BACKGROUND

The present disclosure relates to a near-field transducer (NFT) in heat assisted magnetic recording (HAMR) heads that locally heats media during recording. When light from a laser diode is introduced into the NFT in conventional HAMR heads, the NFT reflects some of the light back to the laser diode. This reflected light causes power fluctuations of the laser, which then results in shifts of data transition points and optical near-field spots in the recorded track as well as changes in the track width, thereby compromising the recording precision and accuracy of the HAMR head. Without addressing these power fluctuations, further advances and improvements in NFT technology will be difficult to realize.

SUMMARY

To address the above described challenges, a heat assisted magnetic recording (HAMR) head with a near-field transducer (NFT) is provided. The HAMR head for mounting in a slider comprises a leading side, a trailing side, and an air bearing surface (ABS). The NFT is disposed in the head and has a distal end with a leading side taper inclined at an acute angle to the ABS, such that an acute angle is formed between a leading surface of the leading side taper and the ABS. A main magnetic pole is disposed in the head facing a trailing side of the NFT. A waveguide core layer is disposed in the head facing the leading side taper of the NFT, on which a high refractive index material (HRIM) layer is positioned.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIG. 6H is a plot illustrating the dependence of the mean temperature rise of the HAMR head on the down track position and refractive index of the disclosed HRIM layer according to the eighth embodiment of the present disclosure;

Figure 1:
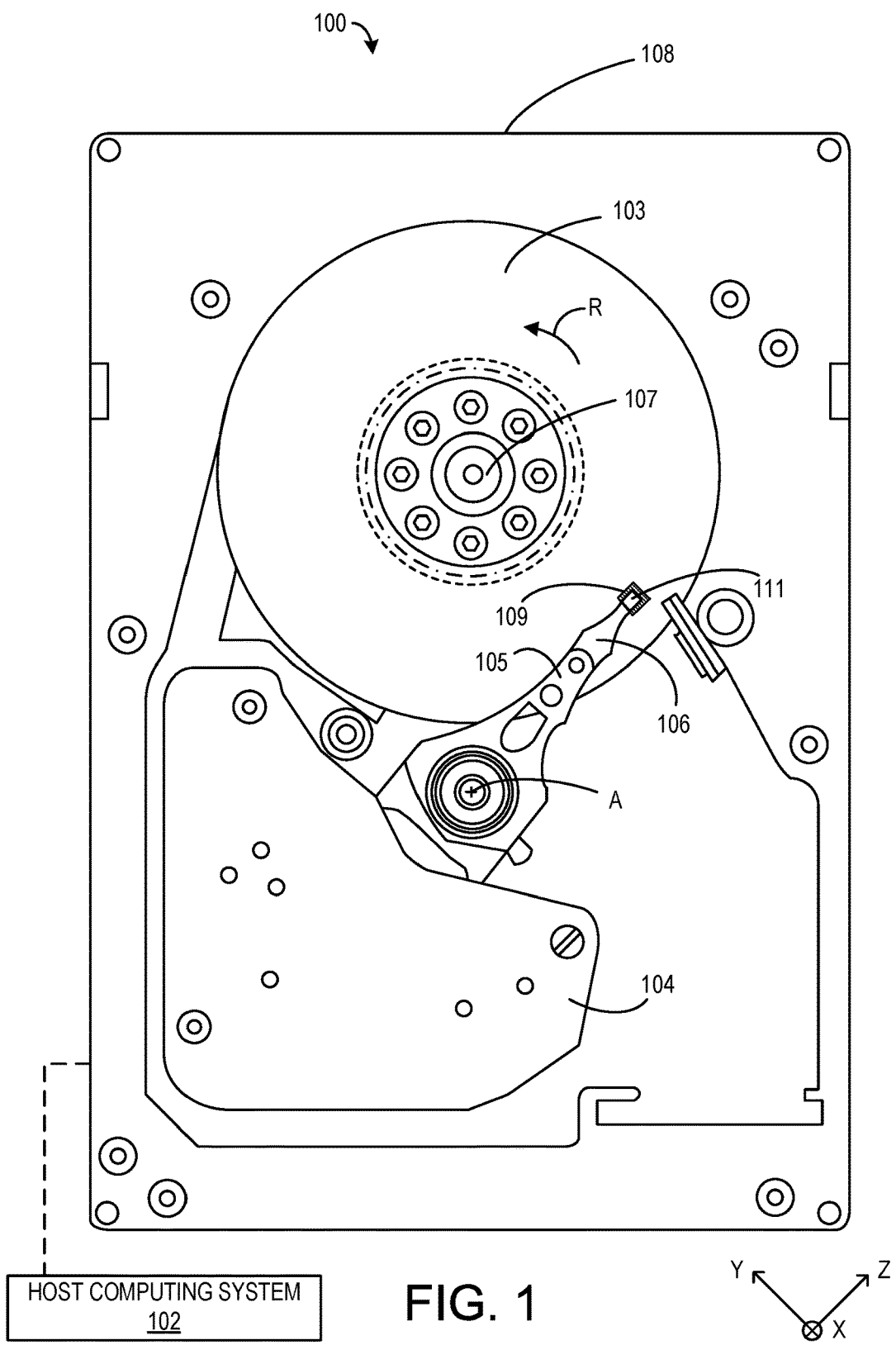
FIG. 1 illustrates an exemplary magnetic disk drive, according to one disclosed embodiment.

It is to be noted that in drawings of the present application, like reference numerals denote like or corresponding portions. Further, in the drawings of the present application, relations of dimensions, such as lengths, widths and thicknesses, are appropriately changed for the sake of clarification as well as simplification of the drawings, and actual dimensional relations are not shown. In particular, the relation of thicknesses is appropriately changed and drawn.

DETAILED DESCRIPTION

Selected embodiments of the present disclosure will now be described with reference to the accompanying drawings. It will be apparent to those skilled in the art from this disclosure that the following description of embodiments of the disclosure is provided for illustration only and not for the purpose of limiting the invention as defined by the appended claims and their equivalents.

Figure 2A:
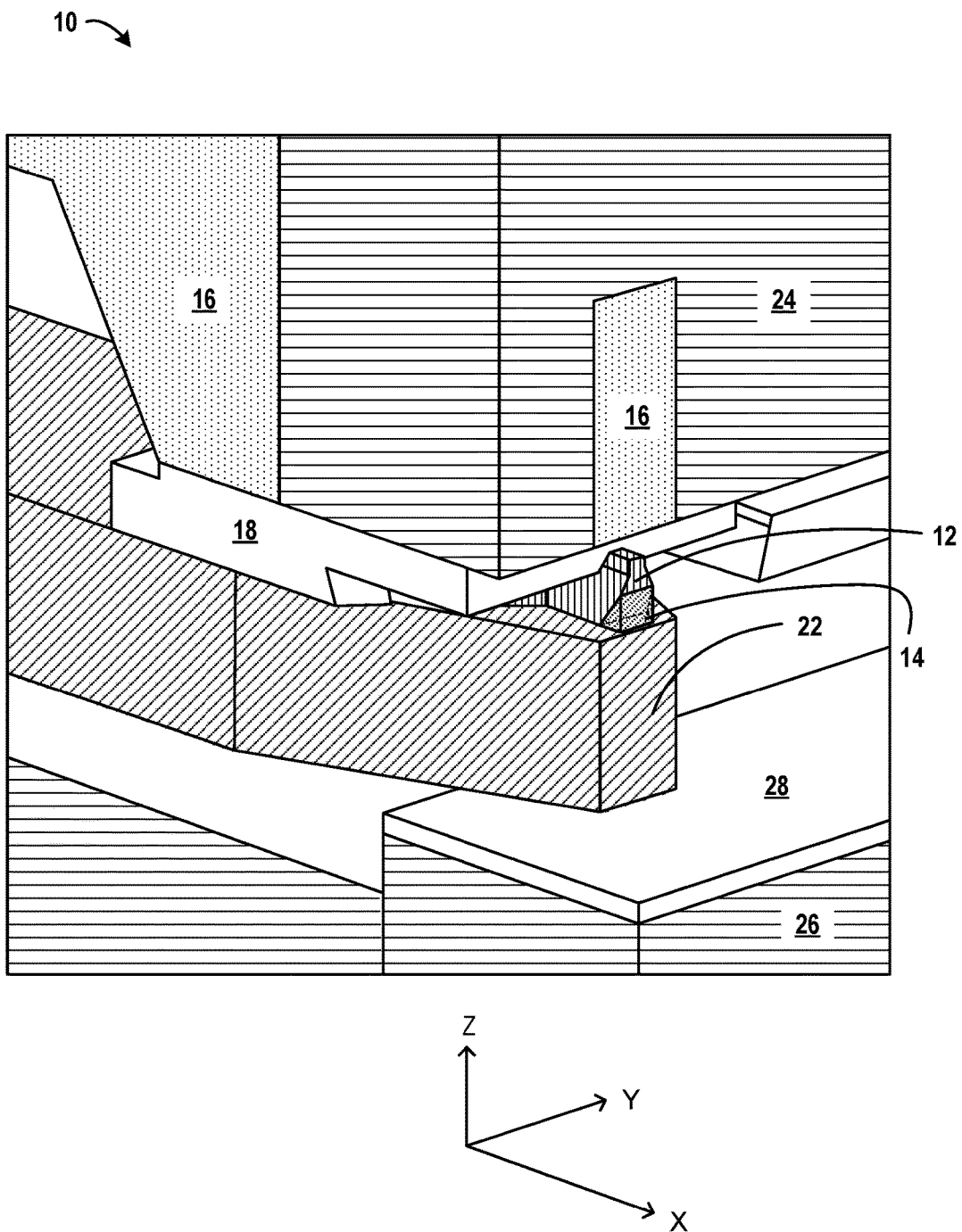
FIG. 2A is a schematic view of a heat assisted magnetic recording (HAMR) head according to a first embodiment of the present disclosure.

The present disclosure is directed to a heat assisted magnetic recording (HAMR) head with a near-field transducer (NFT), an embodiment of which is shown beginning in FIG. 2A, for a magnetic recording system such as a disk drive as shown in FIG. 1.

Turning initially to FIG. 1, this Figure illustrates a top view of an exemplary hard disk drive (HDD) 100, according to an embodiment of the disclosure, into which a heat assisted magnetic recording head (HAMR head) (not shown) of the disclosed embodiments may be incorporated. HDD 100 is coupled to an associated host computing system 102, and is used to store information used by the computing system 102 during processing. As illustrated, HDD 100 may include one or more perpendicular magnetic recording media 103, actuators 104, actuator arms 105, and suspension arms 106 associated with each of the perpendicular magnetic recording media 103, and a spindle motor 107 affixed in a chassis 108. The perpendicular magnetic recording media 103 may be arranged in a vertical stack, if more than one is provided. Moreover, the one or more perpendicular magnetic recording media 103 may be coupled with the spindle motor 107 for rotation in a rotation direction R.

Perpendicular magnetic recording media 103 may include tracks of data on both the top and bottom surfaces of the disk. A HAMR head mounted on a slider 109 may be positioned on a track. As each disk spins, data may be written on and/or read from the data track via a corresponding write head and read head of the recording head. The slider 109 may be coupled to an actuator arm 105 via a suspension arm 106. Actuator arm 105 may be configured to rotate about actuator axis A to place the magnetic head on a particular data track. It is to be understood that the actuator arm 105 alternatively may be configured to move in a manner other than swiveling around actuator axis A.

The suspension arm 106 biases the slider 109 so that the slider 109 bends towards the surface of the perpendicular magnetic recording media 103 when stationary. When the perpendicular magnetic recording media 103 rotates, air is swirled by the rotating disk 103 adjacent to a media facing surface (MFS) of the slider 109, causing the slider 109 to ride on an air bearing a slight distance from the surface of the rotating media 103. For this reason, the MFS is also referred to as an air bearing surface (ABS). When the slider 109 rides on the air bearing, the read and write heads are employed for reading and writing magnetic transitions corresponding to host data of the host computing system 102. The read and write heads are connected to signal processing circuitry that operates according to a computer program implemented in a processor or other logic circuitry integrated within or coupled to the HDD 100 to thereby implement the reading and writing functions. A laser diode 111 is mounted on the top surface of the slider 109. The laser diode 111 may alternatively be provided on the suspension arm 106 and coupled to the slider 109 by an optical channel. In the Figures, the X-direction denotes a height direction perpendicular to the air-bearing surface (ABS) of the slider, the Y-direction denotes a track-width or cross-track direction, and the Z-direction denotes an along-the-track or down-track direction.

Figure 2B:
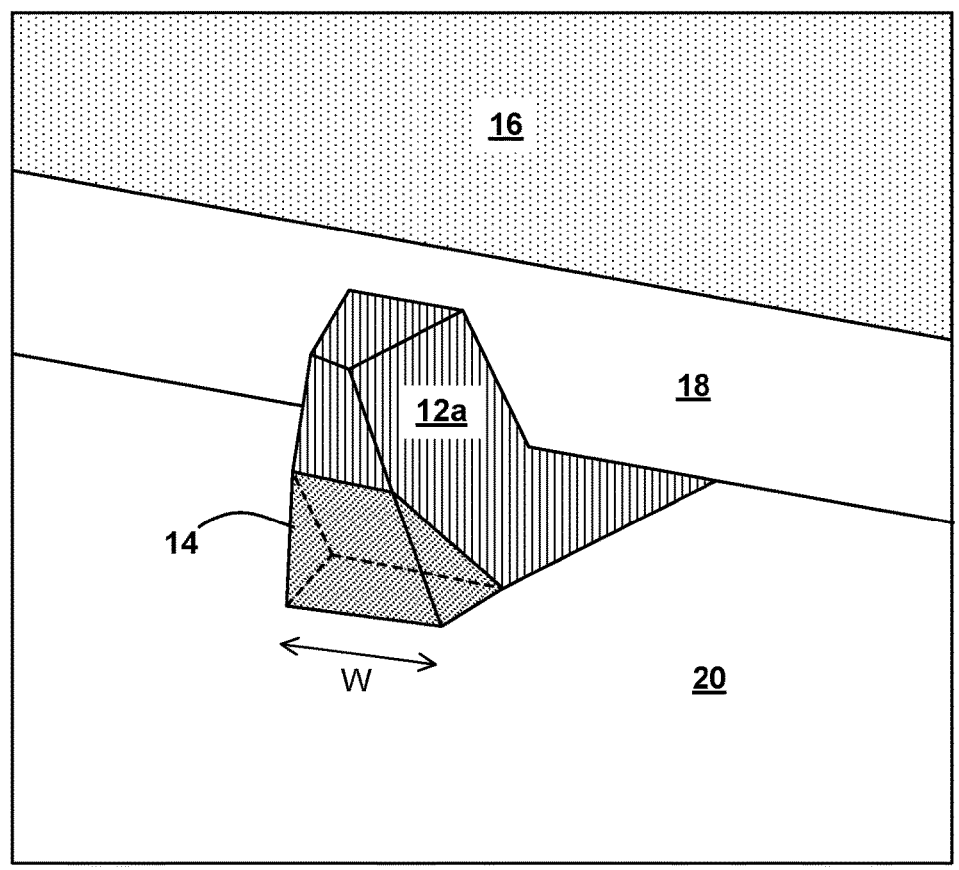
FIG. 2B is a magnified schematic view of the HAMR head according to the first embodiment of the present disclosure.
Figure 2C:
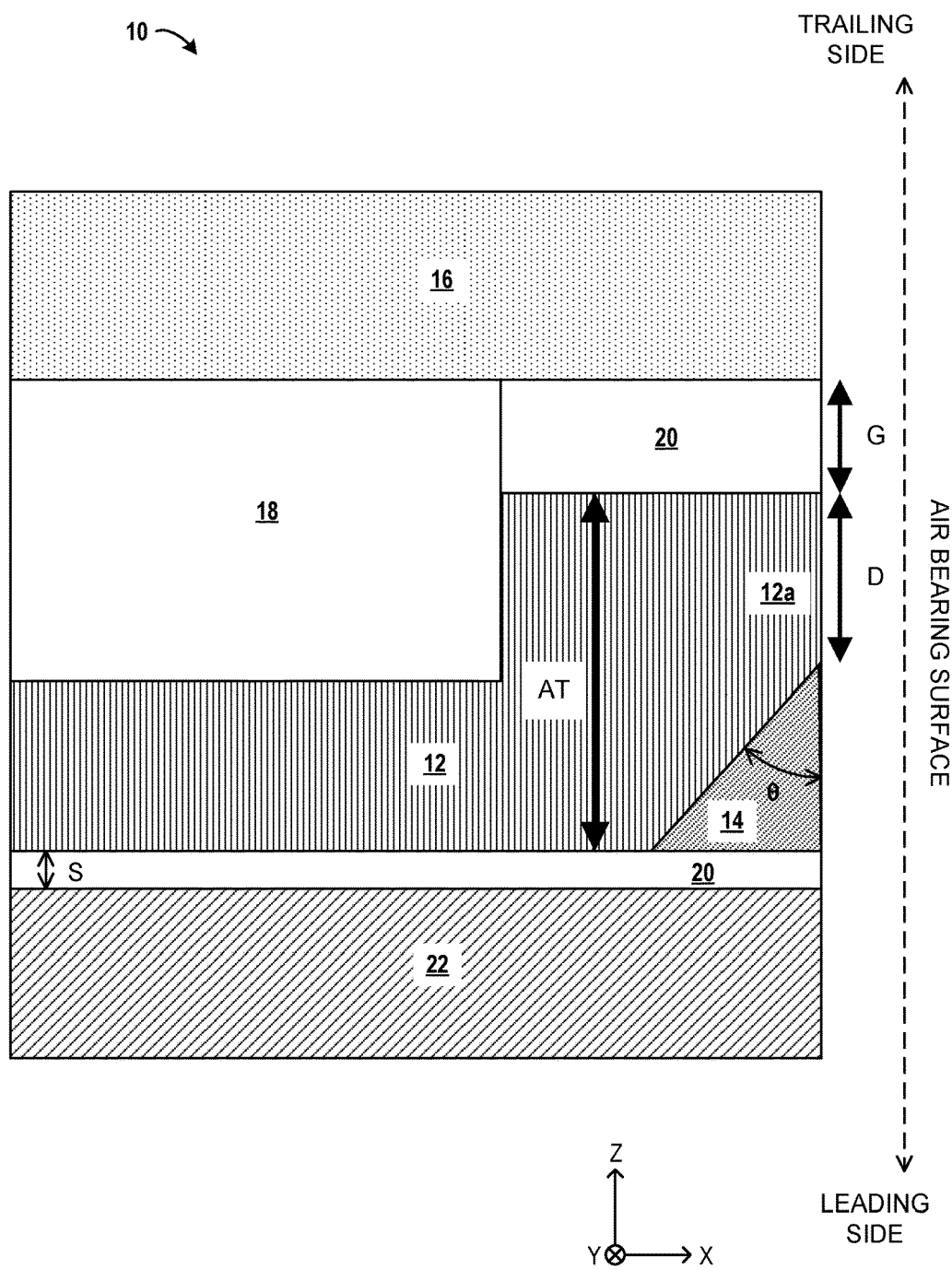
FIG. 2C is a cross-sectional view of the HAMR head according to the first embodiment of the present disclosure.

Referring to FIGS. 2A-D, illustrated are a schematic view, magnified schematic view, a cross-sectional view, and a plan view, respectively, of a HAMR head 10 with an NFT according to a first embodiment of the disclosure. Turning initially to FIG. 2C, the HAMR head 10 is mounted in a slider having a leading side, a trailing side, and an air bearing surface (ABS). An NFT 12, generally described in US published application 2011/0096639, the entire disclosure of which is incorporated by reference, is disposed in the head and has a distal end with a leading side taper inclined at an acute angle to the ABS, such that an angle θ (typically 30 to 60 degrees) is formed between a leading surface of the leading side taper and the ABS. A main magnetic pole 16 is disposed in the head facing a trailing side of the NFT 12. A waveguide core layer 22 is disposed in the head facing the leading side taper of the NFT 12. The HAMR head 10 allows light from the laser to heat a portion of the magnetic recording medium prior to a write operation being performed. The light from the laser can be focused via the waveguide core layer 22 on a precise location of the magnetic medium prior to the main pole 16 performing a write operation. This allows improved areal density to be achieved by allowing the laser to be focused precisely so that the light can be directed at the desired location on the magnetic recording medium.

Figure 2D:
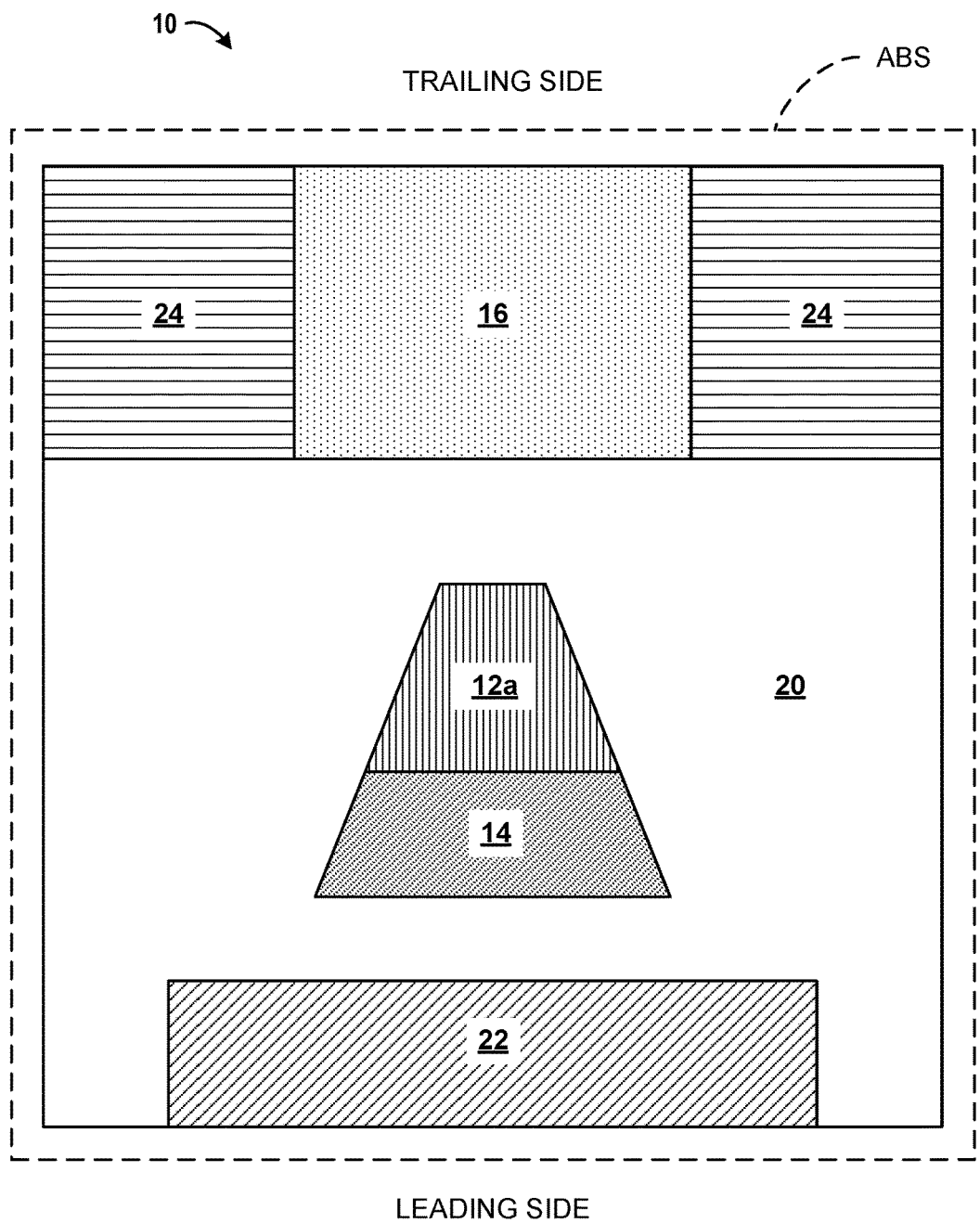
FIG. 2D is a plan view of an air-bearing surface (ABS) of the HAMR head according to the first embodiment of the present disclosure.

Referring to FIG. 2C, the NFT 12 is positioned between the main pole 16 and the waveguide core layer 22, which receives semiconductor laser light from a laser diode and transmits it to the NFT 12. The NFT 12 has a surface parallel to and spaced from the waveguide core layer 22 by a waveguide cladding layer 20 with a thickness of S (typically 5 to 50 nm) between the waveguide core layer 22 and the NFT 12. The thickness S may alternatively be 0 to simplify the fabrication process, although the optical efficiency of the NFT 12 may be decreased in the process of omitting the waveguide cladding layer 20 between the waveguide core layer 22 and the NFT 12. The NFT 12 has an output tip 12a having an end at the ABS. As depicted in FIGS. 2A, 2B, and 2D, the output tip 12a has a roughly triangular or trapezoidal shape with a thickness AT of approximately 70 to 140 nm. The apex D of the output tip 12a has a width of approximately 15 to 90 nm. The output tip 12a is spaced apart from the main pole 16 by a waveguide cladding layer 20 with a thickness G between the NFT 12 and the main pole 16. The NFT 12 comprises a conductive low-loss metal (preferably Au, but also Ag, Al, or Cu or alloys of Au, Ag, Al, or Cu). The semiconductor laser generates an electric field at the NFT output tip 12a, heating a portion of the hard recording layer of the magnetic medium, thereby lowering the coercivity in the specific portion or "bit" so that the magnetic field from the main pole 16 can alter its magnetization.

Turning to FIGS. 2A and 2C, a thermal shunt 18 is positioned recessed from the NFT output tip 12a between the NFT 12 and the main pole 16, contacting the NFT output tip 12a, the waveguide cladding 20, and the main pole 16. The thermal shunt 18 may comprise heat conductive material such as Au. The thermal shunt 18 is configured to conduct heat away from the NFT 12 to the main pole 16. The thermal shunt 18 reduces the temperature rise of the NFT 12, thereby avoiding possible thermal damage to the NFT 12. In turn, the heat sink 24 is configured to conduct heat away from the main pole 16 and facilitates heat transfer for the magnetic medium. As shown in FIG. 2A, the heat sink 24 contacts and surrounds the main pole 16 on its trailing side and also contacts the thermal shunt 18. The heat sink 24 may comprise heat conductive material such as Cu, Au, Ag and alloys of Au, Ag, Al, or Cu.

The main pole 16 is configured to emit a recording magnetic field for affecting a magnetic medium, the main pole 16 serving as a first electrode and having a front portion at the ABS. As shown in FIG. 2A, the return pole 26 serves as a second electrode and also has a front portion at the ABS. The main pole 16 and return pole 26 are both constructed of a magnetic material that produces a high saturation flux density, such as NiFe, CoFeNi, and CoFe.

Turning back to FIG. 2C, the waveguide core layer 22 is disposed in the head facing the leading side taper of the NFT 12 and separated from the NFT 12 and high refractive index material (HRIM) layer 14 by a waveguide cladding 20 with a thickness S between 5 and 50 nm. As depicted in FIG. 2D, the waveguide cladding 20 surrounds the NFT 12 and the HRIM layer 14, insulating at least the NFT output tip 12a and the adjacent portion of the HRIM layer 14 from the waveguide core 22, the heat sink 24, and the main pole 16. For the waveguide core layer 22 and the waveguide cladding layer 20, dielectric materials are selected to ensure that a refractive index of the waveguide core 22 is greater than the refractive index of the waveguide cladding 20, thereby facilitating the efficient propagation of light through the waveguide core 22. For example, $Al_2O_3$ may be used as the clad material and $TiO_2$ as the core material. Alternatively, $SiO_2$ may be used as the clad material and $Ta_2O_5$, $TiO_2$, $SiO_xN_y$, or Ge-doped $SiO_2$ as the core material. The waveguide core 22 may be single-mode or multi-mode, although multi-mode waveguides are known to cause power fluctuations due to intermode interference. Referring back to FIG. 2C, when the semiconductor laser light is introduced by the laser diode into the waveguide core 22, the laser propagates along the length of the waveguide core 22 and an evanescent wave is generated at the surface of the waveguide core 22 proximate the ABS. The evanescent wave at the surface of the waveguide core 22 polarizes in a direction along the plane of the ABS, coupling to a surface plasmon excited on the surface of the NFT output tip 12a. The surface plasmon causes charges to move in a down-track direction and concentrate in the space at the ABS between the NFT output tip 12a and the end of the main pole 16, subsequently generating a localized electrical field that is known as an optical near-field spot. The main pole 16 then applies a magnetic field and affects the magnetization of the portion of the magnetic medium at the optical near-field spot. In conventional HAMR heads, a significant portion of the surface plasmon does not couple to the evanescent wave, which results in some of the light being reflected by the NFT back to the waveguide core and the laser diode, subsequently reducing recording precision and accuracy.

As shown in FIG. 2A, a mirror layer 28 is sandwiched between the return pole 26 and the waveguide core 22. The mirror layer 28 helps direct the semiconductor laser light into the waveguide core 22, so as to create the optimal energy heat transfer to the NFT 12 to generate an optical near-field spot. The mirror layer 28 also reflects scattered light from the NFT 12 and returns the light to the NFT 12 (to suppress the scattered light) when the distance between NFT 12 and the mirror layer 28 is optimal. This improves the optical efficiency of the NFT 12. The mirror layer 28 comprises a reflective material such as Au, Rh and Au alloy. The mirror layer 28 may be positioned at an acute or obtuse angle relative to the plane of the ABS to further optimize this energy heat transfer to the NFT 12.

In view of the above described problem, where the NFT in conventional HAMR heads reflects laser light back to the laser diode, resulting in reduced recording precision and accuracy, a high refractive index material (HRIM) layer 14 is positioned on the leading side taper of the NFT 12. The HRIM layer 14 is configured such that its refractive index is higher than that of the waveguide cladding layer 20, thereby reducing the amount of light that is reflected by the NFT 12 back to the laser diode. For example, the HRIM layer 14 may comprise one of the following materials: $Ta_2O_5$, $TiO_2$, $Cr_2O_3$, $ZrO_2$, $HfO_2$, BeO, $Dy_2O_3$, $GeO_2$, $Lu_2O_3$, MgO, $MoO_3$, $Nb_2O_3$, $Sc_2O_3$, $TeO_2$, $Y_2O_3$, $Yb_2O_3$, ZnO, $In_2O_3$, $SnO_2$, ITO (Indium tin oxide), $ZnO_2$, TNO ($Ti_{1-x}Nb_xO2$), IZO (Indium zinc oxide), ATO (Sb-doped tin oxide), $SrTiO_3$, CdO, $InSbO_4$, $Cd_2SnO_4$, $Zn_2SnO_4$, $LiNbO_3$, $KNbO_3$, SiN, TiN, AlN, GaN, SiC, GaP and Si. The HRIM layer 14 may comprise two or more layers with different materials (multilayer consisting of different dielectric materials). The HRIM layer 14 may comprise a material with a large hardness such as $TiO_2$, $ZrO_2$, $HfO_2$, SiN, TiN, AlN, and SiC, thereby increasing the physical robustness of the NFT 12. The HRIM layer 14 may also help decrease the temperature of the NFT 12 by absorbing excess heat with thermally conductive material such as AlN, SiC and Si. The refractive index of the HRIM layer 14 may be between 1.7 and 2.7, for example, or any value that is higher than the refractive index of the waveguide cladding layer 20. In this embodiment, as depicted in FIG. 2B, the width W of the HRIM layer in a cross-track direction of the head is substantially similar to a width of the NFT in the cross-track direction of the head. Further in this embodiment, the HRIM layer 14 substantially occupies a wedge-like volume demarcated by the ABS, the surface of the leading side taper of the NFT output tip 12a, and the trailing side of the waveguide cladding layer 20.

Figure 2E:
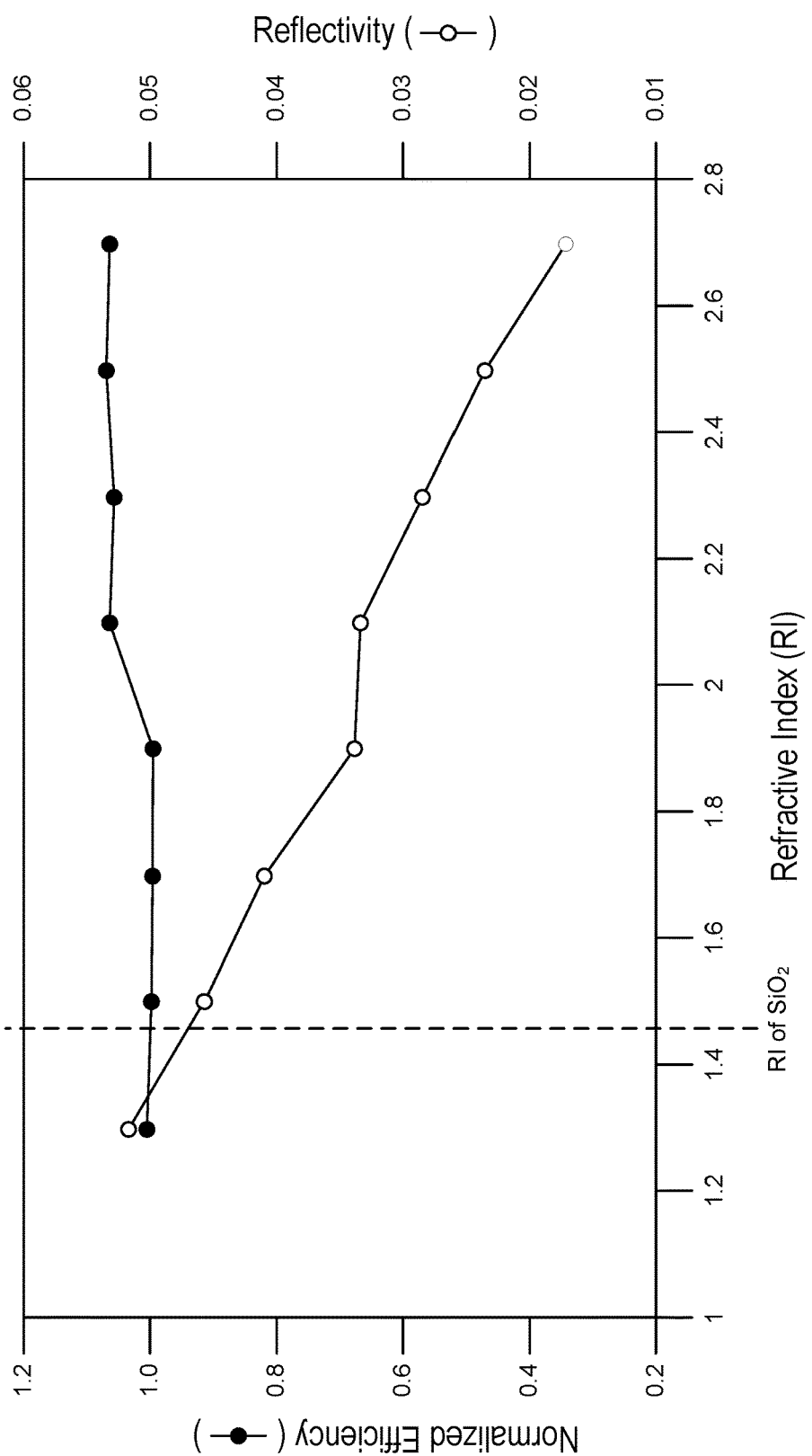
FIG. 2E is a plot illustrating the dependence of the normalized optical efficiency and reflectivity of the near-field transducer (NFT) of the HAMR head on the refractive index of the disclosed high refractive index material (HRIM) layer according to the first embodiment of the disclosure.

Referring to FIG. 2E, illustrated is a plot illustrating the dependence of the normalized optical efficiency and reflectivity of the NFT 12 of the HAMR head 10 on the refractive index of the HRIM layer 14 according to the first embodiment of the disclosure. In the plots depicted in the Figure, a reflectivity of 0.05 (5%) roughly reflects the NFT reflectivity of a typical conventional HAMR head. It is clearly demonstrated that a higher refractive index of the HRIM layer 14 achieves a lower reflectivity of the NFT 12 of the HAMR head 10 than a lower refractive index of the HRIM layer 14, without compromising the optical efficiency of the HAMR head 10. The optical efficiency of the NFT 12 with the HRIM layer 14 can be even higher than that of the NFT without HRIM layer when the refractive index of HRIM layer 14 is higher than 1.9. This increase of the optical efficiency reduces the required laser power as well as the NFT temperature. A vertical dashed line illustrates the refractive index of 1.45 for $SiO_2$, which is a common material for the waveguide cladding layer 20. It will be appreciated that, in the disclosed embodiments, the refractive index of the HRIM layer 14 will be greater than 1.45 if the waveguide cladding layer 20 is configured to be $SiO_2$. To reduce the power fluctuation of the laser caused by the reflected light from the NFT 12, a refractive index from 1.7 up to at least 2.7 for the HRIM layer 14 has practical application in the disclosed HAMR head 10 in reducing the amount light reflected by the NFT 12 back to the laser diode. However, the refractive index may not be limited to the range of 1.7 to 2.7, and may be configured as high as 4.0, for example.

Figure 3A:
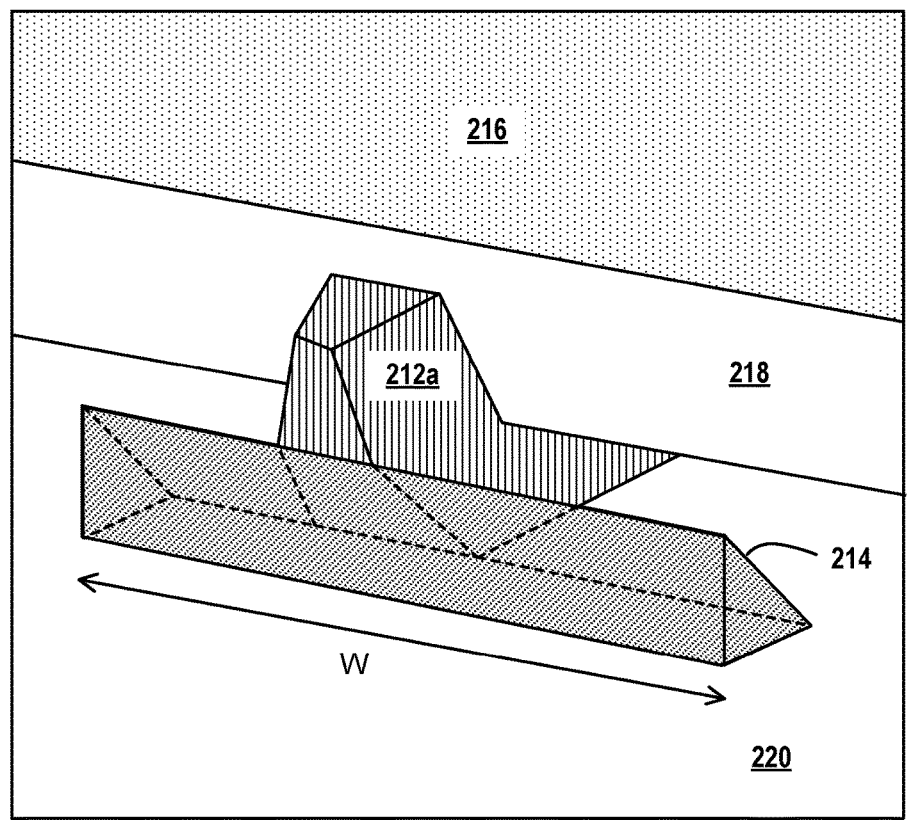
FIG. 3A is a schematic view of the HAMR head according to a second embodiment of the present disclosure.
Figure 3A:
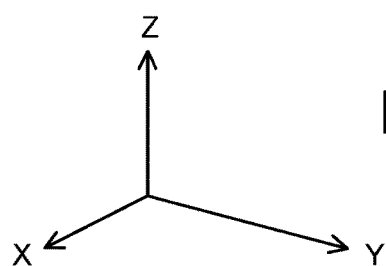
Figure 3B:
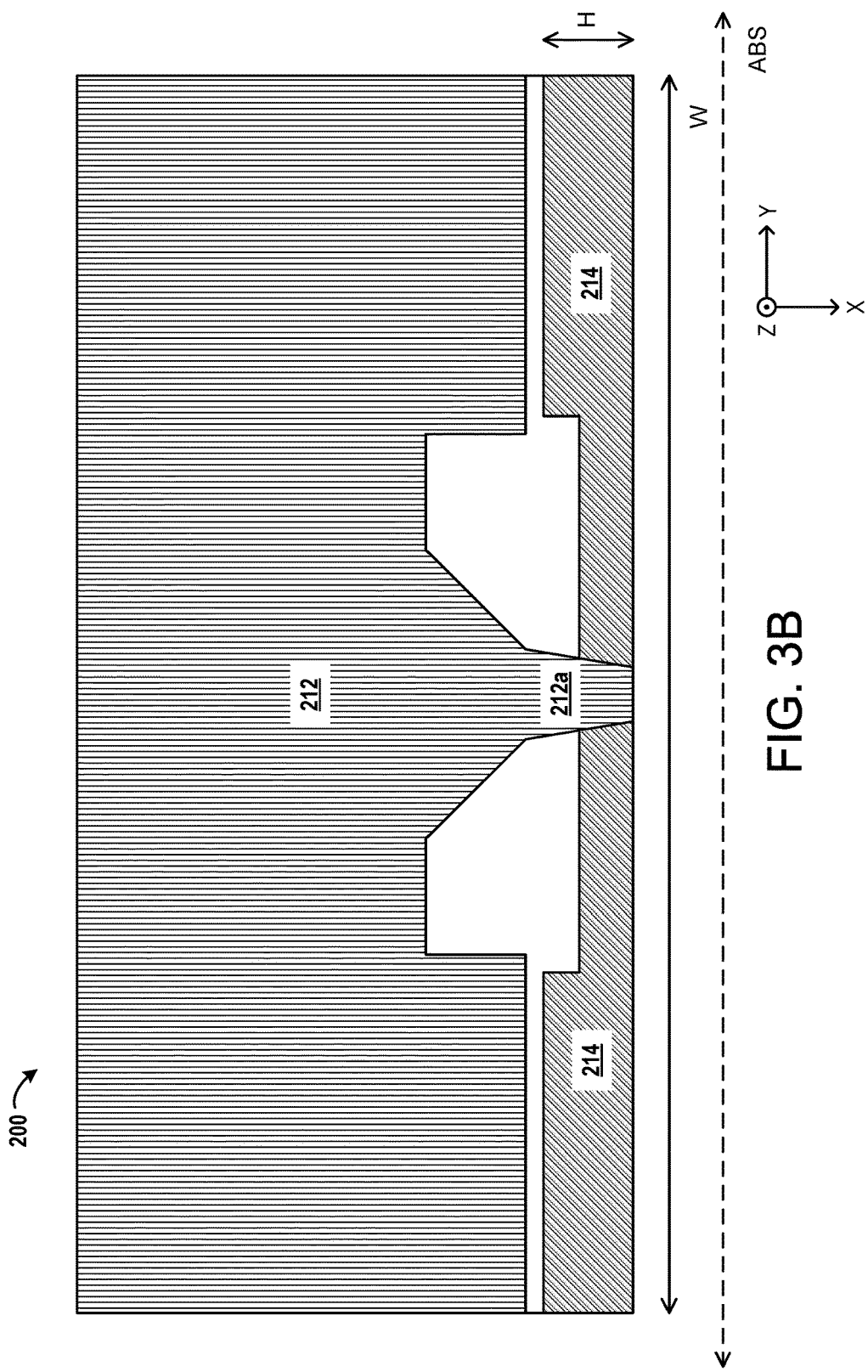
FIG. 3B is a top surface perspective view of the HAMR head according to the second embodiment of the present disclosure.

Referring to FIGS. 3A-B, a HAMR head 210 is shown according to the second embodiment of the present disclosure. Since the HAMR head 210 of the second embodiment is generally similar to that of the first embodiment with the exception of the width W of the HRIM layer 214, the detailed description thereof is abbreviated here for the sake of brevity. It is to be noted that like parts are designated by like reference numerals throughout the detailed description and the accompanying drawings. In this embodiment, a width W of the HRIM layer 214 in a cross-track direction of the head is greater than a width of the NFT 212 in the cross-track direction of the head. Aside from simplifying the manufacturing process, a longer width of the HRIM layer 214 is believed to add mechanical stability to the HAMR head 210, increasing protection for the NFT 212 and preventing delamination of the HRIM layer 214 from the NFT 212 during operation, especially under thermal and mechanical stresses. As shown in FIG. 3B, the HRIM layer 214 may have a predetermined height in a direction perpendicular to the ABS of the head—the height may be configured to be longer only in certain portions along the width of the HRIM layer, such as the distal ends along the cross-track direction in this embodiment, or the height may alternatively be uniform across the width of the HRIM layer 214 along the cross-track direction. The additional height of the HRIM layer 214 is also believed to add further mechanical stability to the HAMR head 210.

Figure 4A:
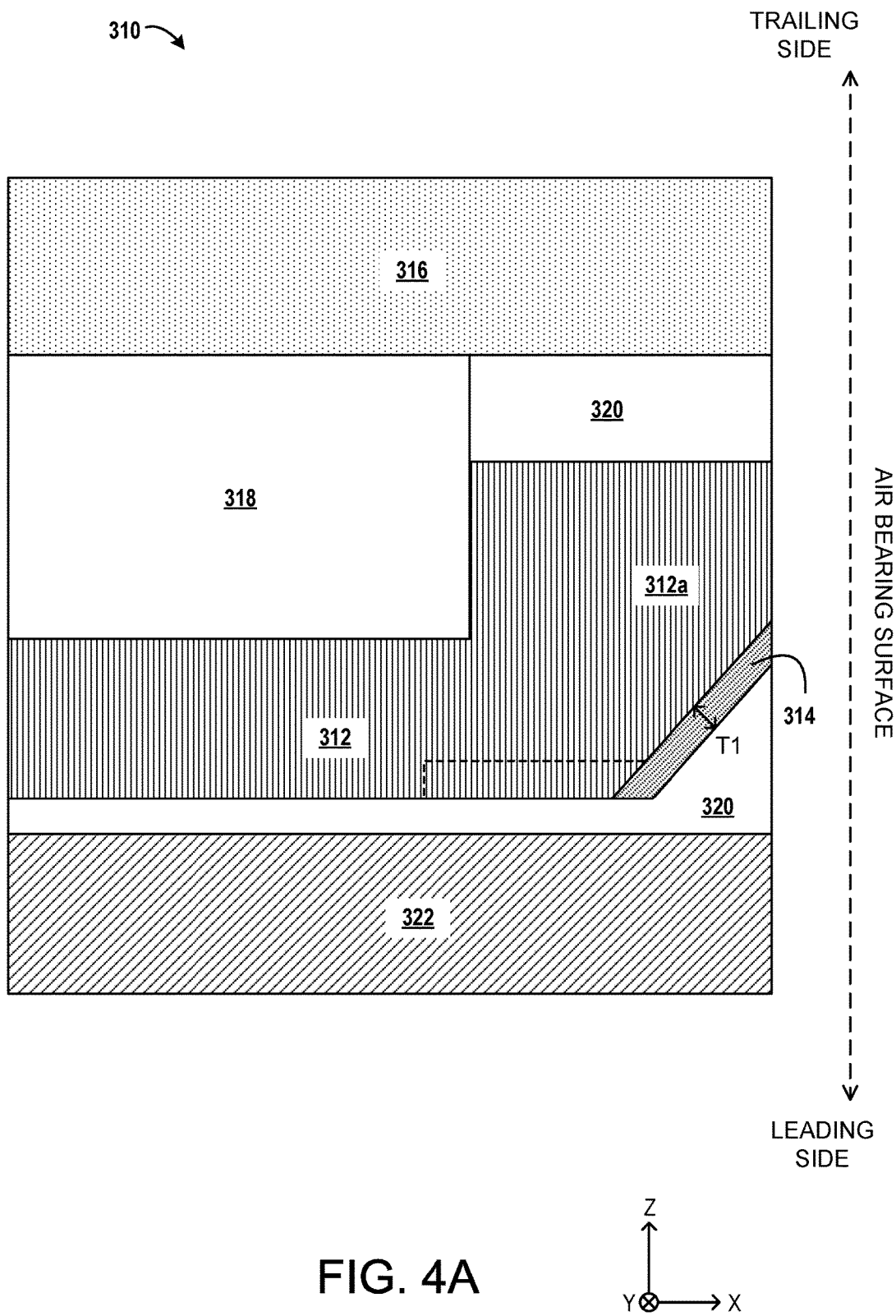
FIG. 4A is a cross-sectional view of the HAMR head according to a third embodiment of the present disclosure.

Referring to FIG. 4A, a HAMR head 310 is shown according to the third embodiment of the present disclosure. Since the HAMR head 310 of the third embodiment is generally similar to that of the first embodiment with the exception of the configuration of the HRIM layer 314, the detailed description thereof is abbreviated here for the sake of brevity. It is to be noted that like parts are designated by like reference numerals throughout the detailed description and the accompanying drawings. In this embodiment, the HRIM layer 314 has a substantially uniform first thickness T1 along the leading surface. Unlike the first embodiment, only a portion of the wedge-like volume demarcated by the ABS, the surface of the leading side taper of the NFT output tip 312a, and the trailing side of the waveguide cladding layer 320 is occupied by the HRIM layer 314, potentially reducing material costs during manufacturing. It will be appreciated that, like the first embodiment, the width of the HRIM layer 314 in a cross-track direction of the head may be substantially similar to a width of the NFT 312 in the cross-track direction of the head, or like the second embodiment, greater than the width of the NFT 312. The HRIM layer 314 may extend along the waveguide cladding layer 320 and NFT 312 in a height direction substantially perpendicular to the ABS (X-direction) as shown by the dotted line in FIG. 4A to make fabrication process simple. The HRIM layer 314 may extend along the waveguide cladding layer 320 and NFT 312 all the way to the back edge of the NFT 312.

Figure 4B:
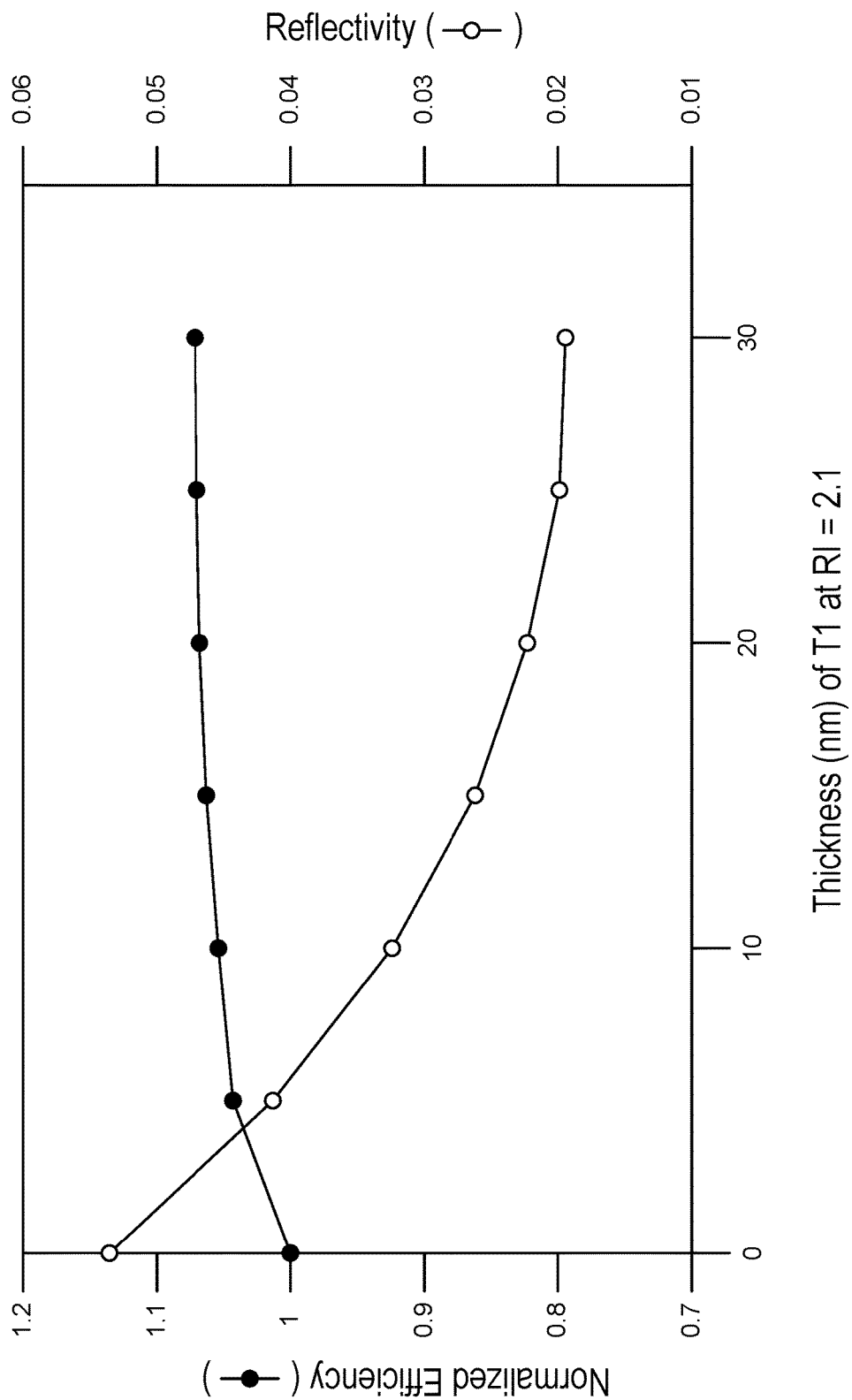
FIG. 4B is a plot illustrating the dependence of the normalized optical efficiency and reflectivity of the NFT of the HAMR head on the thickness of the HRIM layer according to the third embodiment of the present disclosure.

Referring to FIG. 4B, illustrated is a plot showing the dependence of the normalized optical efficiency and reflectivity of the NFT 312 of the HAMR head 310 on the thickness of the HRIM layer 314 according to the third embodiment of the present disclosure. The normalized optical efficiency and reflectivity of the NFT 312 of the HAMR head 310 were measured at various thicknesses T1 of the HRIM layer 314 while the refractive index of the HRIM layer 314 was kept constant at 2.1. As demonstrated by the plot, the reflectivity of the NFT 312 of the HAMR head 310 is inversely proportional to the thickness of the HRIM layer 314, while the normalized optical efficiency of the HAMR head 310 slightly increases with an increased thickness of the HRIM layer 314. Taking into account the physical robustness and the optical efficiency of the NFT 312, a thickness of the HRIM layer 314 from at least 5 nm up to at least 25 nm has practical application in the disclosed HAMR head 310 in reducing the amount of light reflected by the NFT 312 back to the laser diode.

Figure 5A:
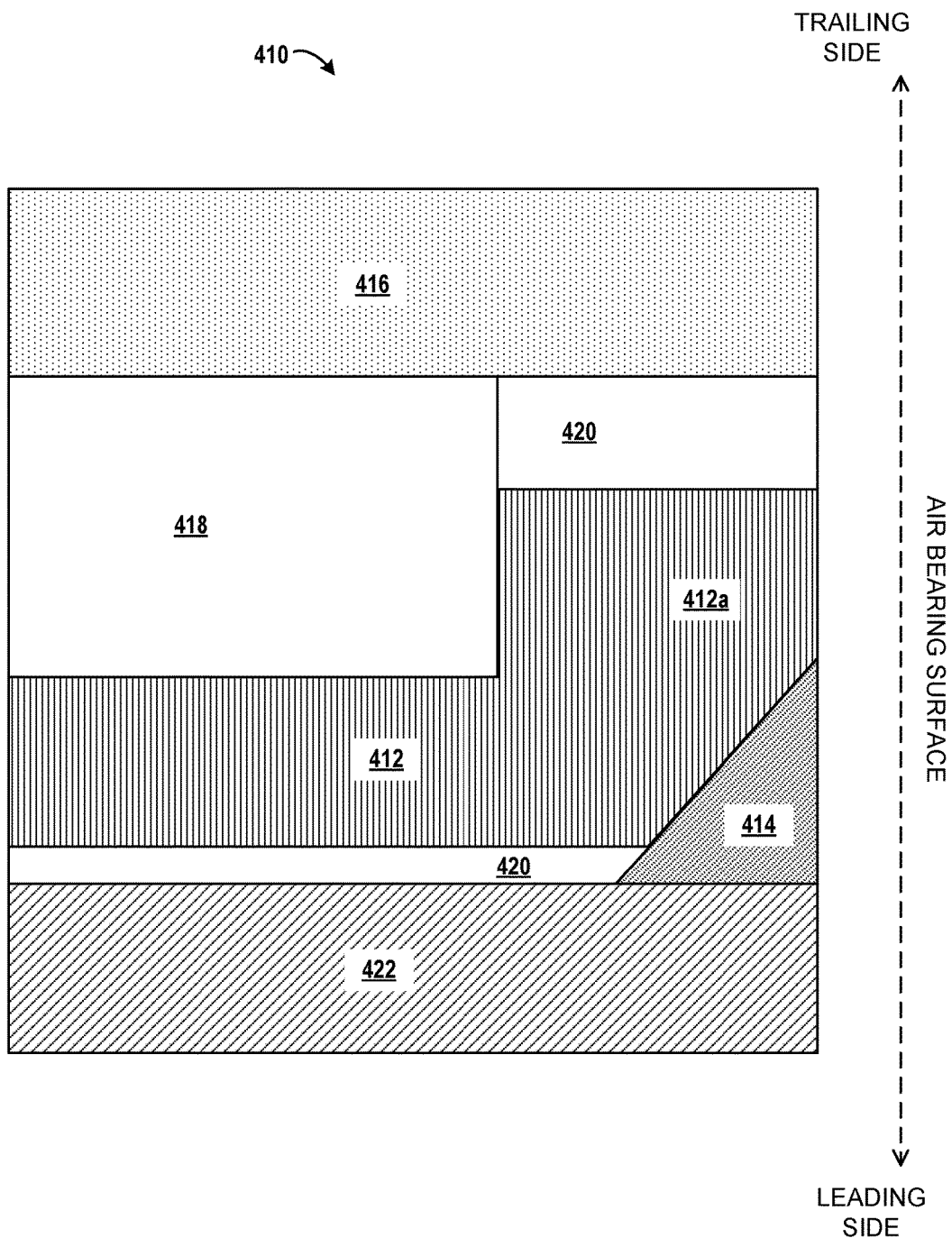
FIG. 5A is a cross-sectional view of the HAMR head according to a fourth embodiment of the present disclosure.

Referring to FIG. 5A, a HAMR head 410 is shown according to the fourth embodiment of the present disclosure. Since the HAMR head 410 of the fourth embodiment is generally similar to that of the first embodiment with the exception of the configuration of the HRIM layer 414, the detailed description thereof is abbreviated here for the sake of brevity. It is to be noted that like parts are designated by like reference numerals throughout the detailed description and the accompanying drawings. In this embodiment, the HRIM layer 414 extends in a leading side direction and contacts the waveguide core layer 422. Partially displacing the waveguide cladding layer 420 with the HRIM layer 414 to contact the HRIM layer 414 with the waveguide core layer 422 achieves the potential advantage of further reducing the reflectivity of the NFT 412 of the HAMR head 410 while resulting in a minimal decrease in the optical efficiency of the HAMR head 410. It will be appreciated that HRIM layer 414 may contact with the waveguide core layer 422 as long as their refractive indices are different from each other. It will be further appreciated that, like the first embodiment, the width of the HRIM layer 414 in a cross-track direction of the head may be substantially similar to a width of the NFT 412 in the cross-track direction of the head, or like the second embodiment, greater than the width of the NFT 412.

Figure 5B:
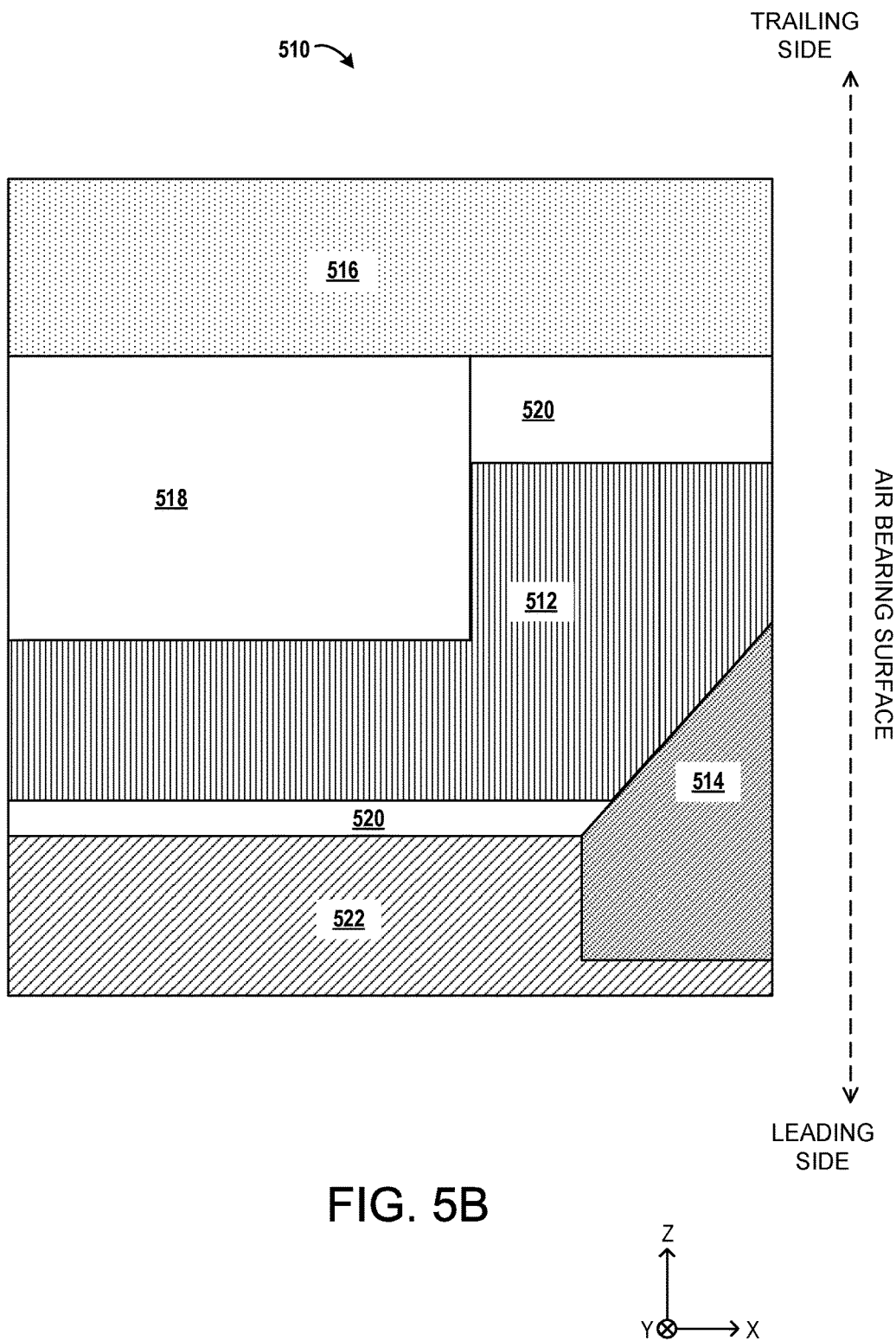
FIG. 5B is a cross-sectional view of the HAMR head according to a fifth embodiment of the present disclosure.

Referring to FIG. 5B, a HAMR head 510 is shown according to the fifth embodiment of the present disclosure. Since the HAMR head 510 of the fifth embodiment is generally similar to that of the first embodiment with the exception of the configuration of the HRIM layer 514, the detailed description thereof is abbreviated here for the sake of brevity. It is to be noted that like parts are designated by like reference numerals throughout the detailed description and the accompanying drawings. In this embodiment, the HRIM layer 514 extends in a leading side direction so as to be embedded within the waveguide core layer in the leading side direction. Like the fourth embodiment, partially displacing the waveguide cladding layer 520 with the HRIM layer 514 to contact the HRIM layer 514 with the waveguide core layer 522 achieves the potential advantage of further reducing the reflectivity of the NFT 512 of the HAMR head 510 while resulting in a minimal decrease in the optical efficiency of the HAMR head 510. It will be further appreciated that, like the first embodiment, the width of the HRIM layer 514 in a cross-track direction of the head may be substantially similar to a width of the NFT 512 in the cross-track direction of the head, or like the second embodiment, greater than the width of the NFT 512.

Figure 5C:
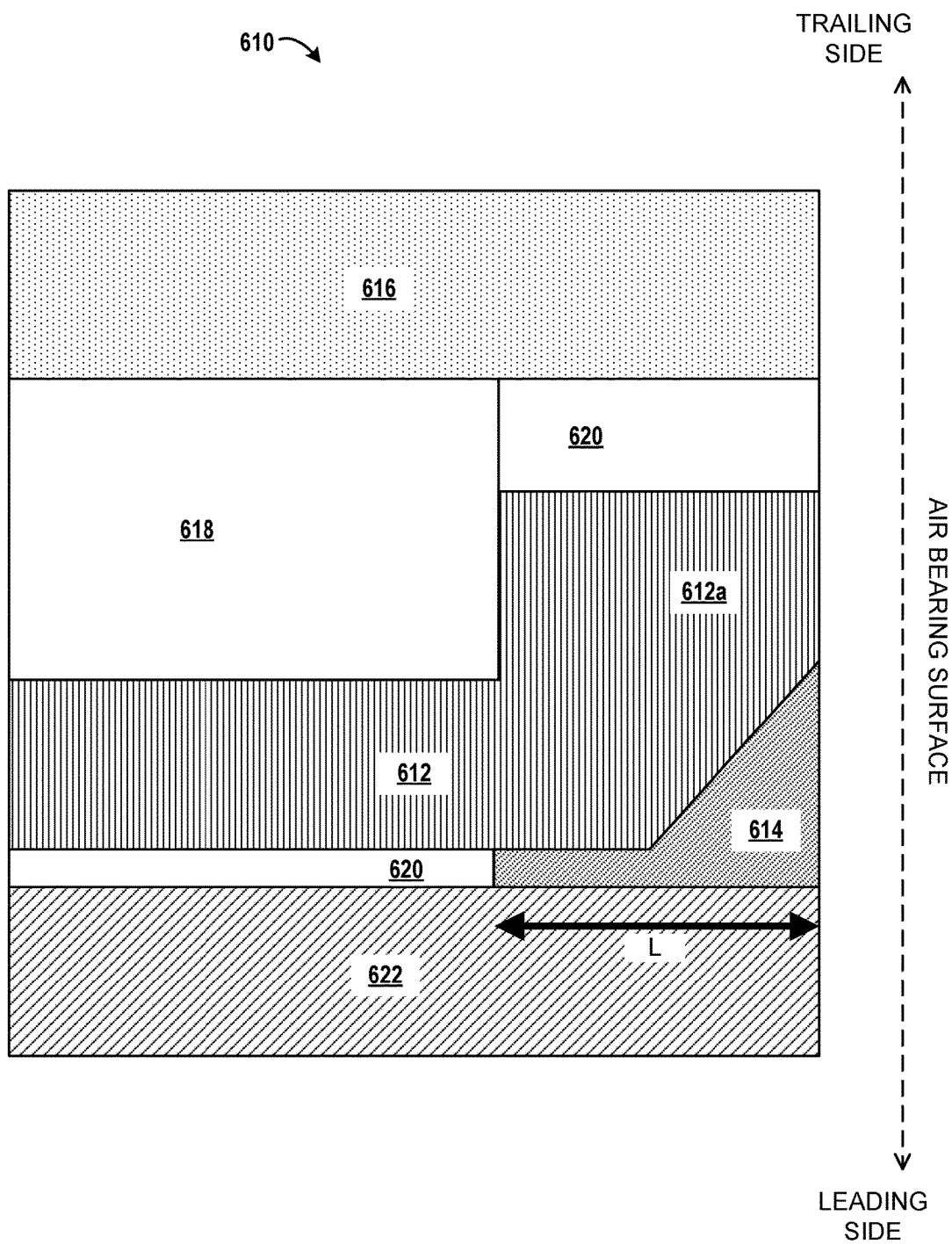
FIG. 5C is a cross-sectional view of the HAMR head according to a sixth embodiment of the present disclosure.

Referring to FIG. 5C, a HAMR head 610 is shown according to the sixth embodiment of the present disclosure. Since the HAMR head 610 of the sixth embodiment is generally similar to that of the first embodiment with the exception of the configuration of the HRIM layer 614, the detailed description thereof is abbreviated here for the sake of brevity. It is to be noted that like parts are designated by like reference numerals throughout the detailed description and the accompanying drawings. In this embodiment, the HRIM layer 614 extends along a length L of the waveguide core layer and NFT in a height direction substantially perpendicular to the ABS (X-direction). The HRIM layer 614 may extend along a length of 300 to 500 nm in the X-direction. Like the fourth and fifth embodiments, partially displacing the waveguide cladding layer 620 with the HRIM layer 614 to contact the HRIM layer 614 with the waveguide core layer 622 achieves the potential advantage of further reducing the reflectivity of the NFT 612 of the HAMR head 610 while resulting in a minimal decrease in the optical efficiency of the HAMR head 610. It will be further appreciated that, like the first embodiment, the width of the HRIM layer 614 in a cross-track direction of the head may be substantially similar to a width of the NFT 612 in the cross-track direction of the head, or like the second embodiment, greater than the width of the NFT 612.

Figure 5D:
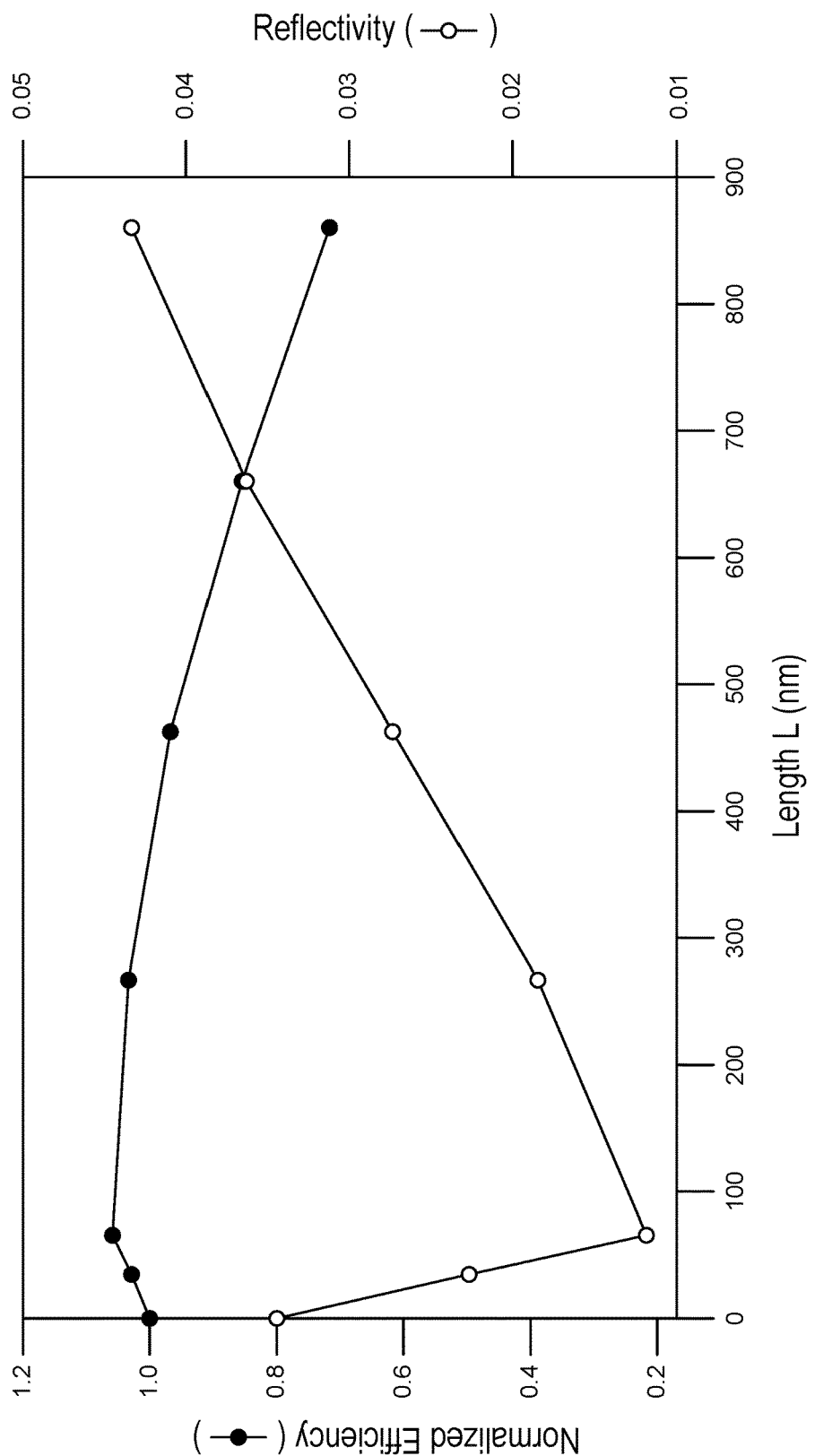
FIG. 5D is a plot illustrating the dependence of the normalized optical efficiency and reflectivity of the NFT of the HAMR head on the length of the HRIM layer in a direction perpendicular to the ABS according to the sixth embodiment of the present disclosure.

Referring to FIG. 5D, illustrated is a plot showing the dependence of the normalized optical efficiency and reflectivity of the NFT 612 of the HAMR head 610 on the length of the HRIM layer 614 in a height direction perpendicular to the ABS according to the sixth embodiment of the present disclosure. As demonstrated in this plot, the reflectivity of the NFT 612 of the HAMR head 610 initially decreases steeply with an increase in the length L from 0 nm to approximately 80 nm, and then subsequently increases with length between approximately 80 nm and approximately 650 nm, at which the reflectivity of the NFT 612 of the HAMR head 610 is roughly equivalent to that of the conventional HAMR head. At the same time, the normalized optical efficiency of the HAMR head 610 only decreases 0.2 units with an increase in the length L from 0 to approximately 650 nm. Thus, configuring the length of the HRIM layer 614 to extend between 30 nm and 500 nm along the length of the waveguide core layer 622 and NFT 612 in a height direction substantially perpendicular to the ABS achieves the potential advantage of further reducing the reflectivity of the NFT 612 of the HAMR head 610 without unduly compromising the optical efficiency.

Figure 6A:
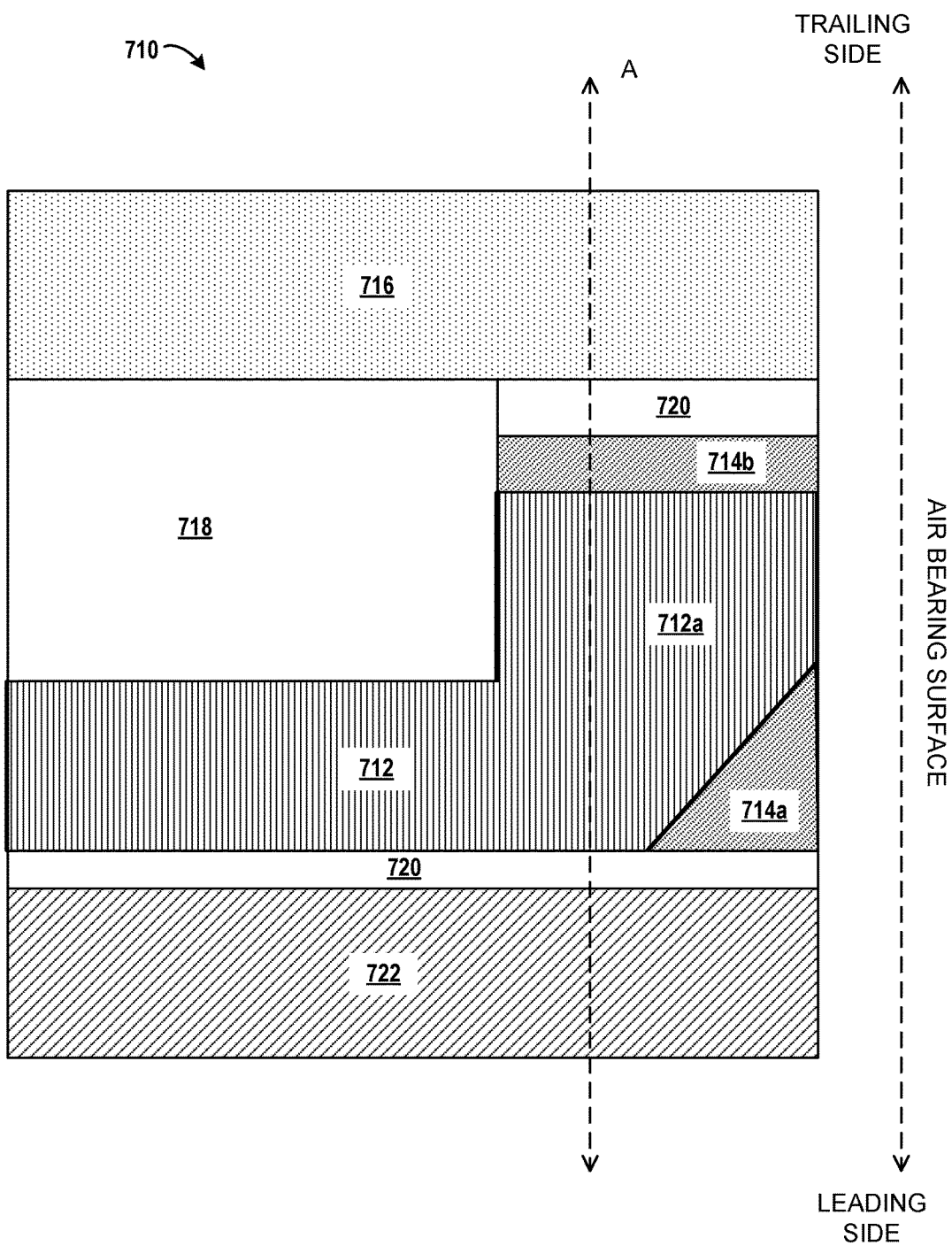
FIG. 6A is a cross-sectional view of the HAMR head according to a seventh embodiment of the present disclosure.
Figure 6B:
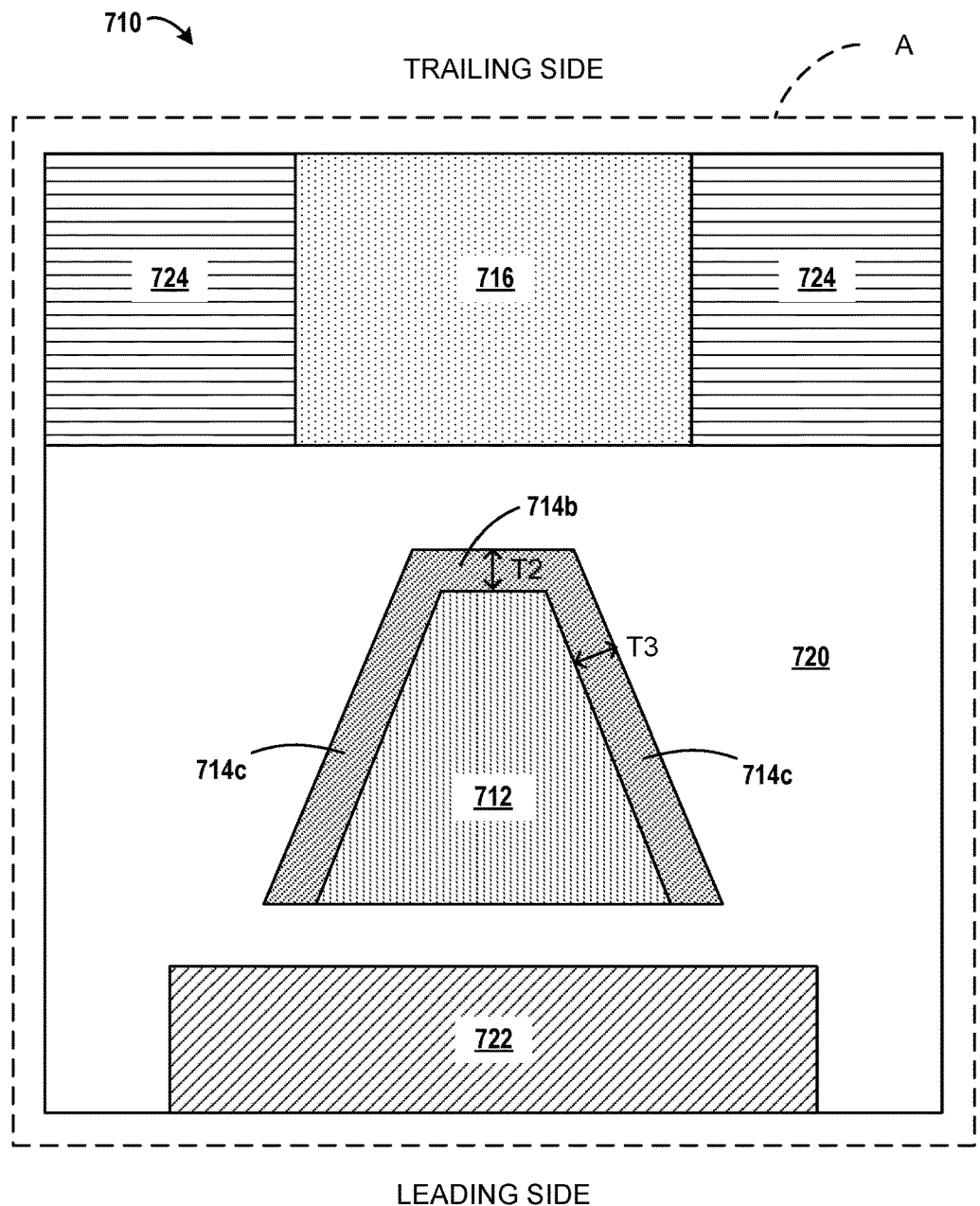
FIG. 6B is a cross-sectional view of the HAMR head, taken along line A in FIG. 6A, according to a seventh embodiment of the present disclosure.

Referring to FIGS. 6A-B, a HAMR head 710 is shown according to the seventh embodiment of the present disclosure. Since the HAMR head 710 of the seventh embodiment is generally similar to that of the first embodiment with the exception of the configuration of the HRIM layer 714, the detailed description thereof is abbreviated here for the sake of brevity. It is to be noted that like parts are designated by like reference numerals throughout the detailed description and the accompanying drawings. It will be noted that the FIG. 6B is a cross-sectional view of the HAMR head 710 taken along line A in FIG. 6A, in which the first HRIM layer portion 714a is not visible. In this embodiment, the HRIM layer 714 extends so as to form a second HRIM layer portion 714b with a second uniform thickness covering a trailing edge surface of the distal end of the NFT facing the main magnetic pole 716, and extends so as to form a third HRIM layer portion 714c with a third uniform thickness T3 covering cross-track facing surfaces of the distal end 712a of the NFT. By covering the trailing edge surface and cross-track facing surfaces of the distal end 712a of the NFT 712, the second HRIM layer portion 714b and third HRIM layer portion 714c reduce adjacent track interference (ATI) that comes from background light on adjacent tracks. Like the first through sixth embodiments, the HAMR head 710 also has a first HRIM layer portion 714a that is positioned on the leading side taper of the NFT 712, thereby also achieving the potential advantages of the first through sixth embodiments of the present disclosure as described above. The HRIM layer 714 may comprise two or more layers with different materials (multilayer consisting of different dielectric materials).

Figure 6C:
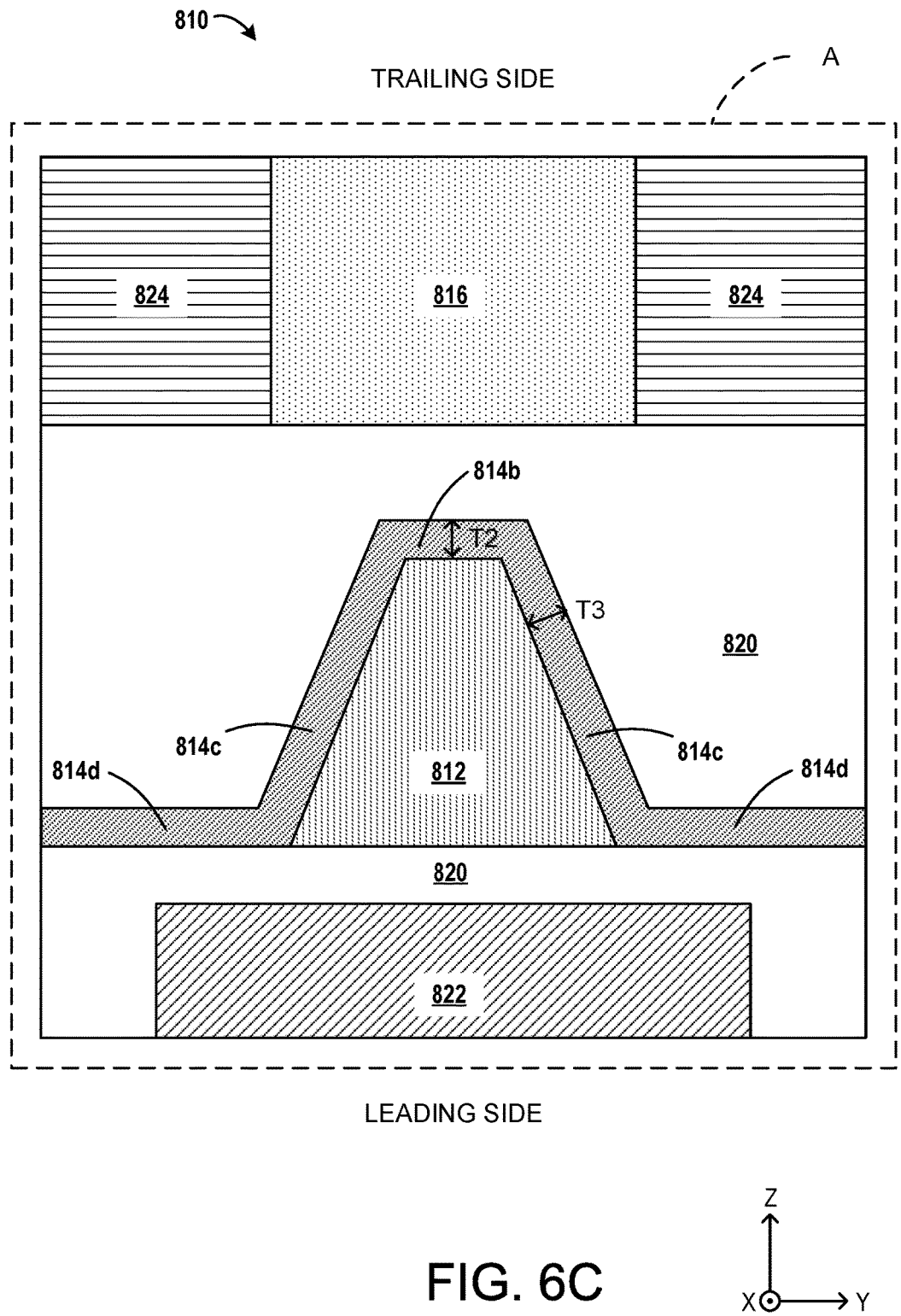
FIG. 6C is a cross-sectional view of the HAMR head according to an eighth embodiment of the present disclosure, taken along a line that corresponds to line A in FIG. 6A in the seventh embodiment.

Referring to FIG. 6C, a HAMR head 810 is shown according to the eighth embodiment of the present disclosure. Since the HAMR head 810 of the eighth embodiment is generally similar to that of the seventh embodiment with the exception of the configuration of the HRIM layer 814 in the cross-track direction, the detailed description thereof is abbreviated here for the sake of brevity. It is to be noted that like parts are designated by like reference numerals throughout the detailed description and the accompanying drawings. It will be noted that the FIG. 6C is a cross-sectional view of the HAMR head 810 taken along a line that corresponds to line A in FIG. 6A in the seventh embodiment, in which the first HRIM layer portion 814a is not visible. Like the second embodiment, the HRIM layer 814 also extends in a cross-track direction. The HRIM layer 814 forms a fourth HRIM layer portion 814d that extends in cross-track directions from the third HRIM layer portion 814c in parallel with the waveguide core layer 822, achieving similar potential advantages to the second embodiment, including simplifying the manufacturing process, adding mechanical stability to the HAMR head 810, and increasing protection for the NFT 812 and preventing delamination of the HRIM layer 814 from the NFT 812 during operation, especially under thermal and mechanical stresses.

Figure 6D:
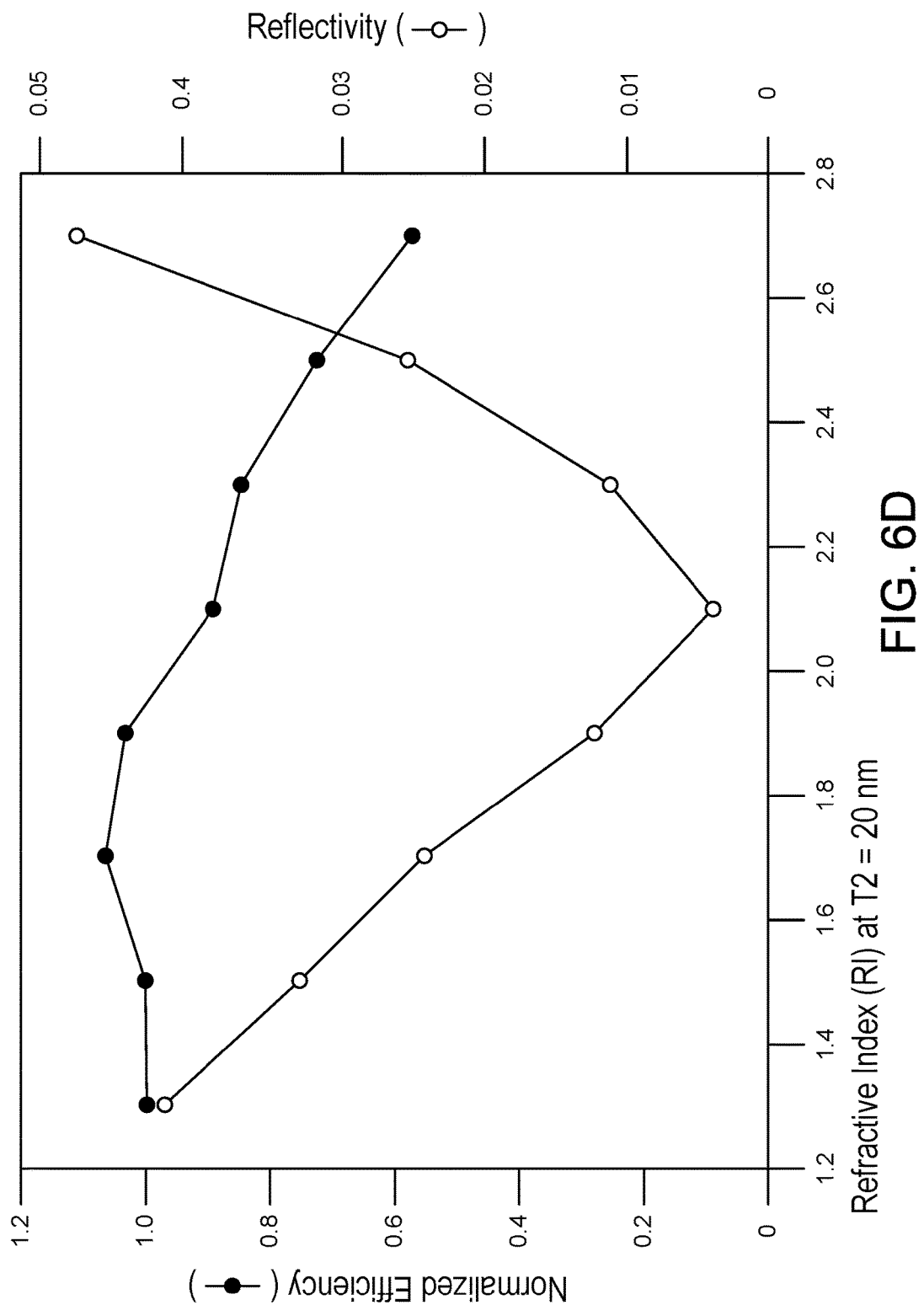
FIG. 6D is a plot illustrating the dependence of the normalized optical efficiency and reflectivity of the NFT of the HAMR head on the thickness of the second HRIM layer portion according to the eighth embodiment of the present disclosure.

Referring to FIG. 6D, illustrated is a plot showing the dependence of the normalized optical efficiency and reflectivity of the NFT 812 of the HAMR head 810 on the refractive index of the second HRIM layer portion 814b according to the eighth embodiment of the present disclosure, where the thickness T2 is kept constant at 20 nm. Although this plot reflects data for the eighth embodiment, it will be appreciated that similar plots for the normalized optical efficiency and reflectivity would be demonstrated for the NFT of the HAMR head in any embodiment of the present disclosure, in which the HRIM layer also covers the trailing side and cross-track facing surfaces of the output end of the NFT. As demonstrated by FIG. 6D, the lowest reflectivity is achieved at a refractive index of approximately 2.1, while the optical efficiency falls below 0.8 when the refractive index is greater than 2.4. From the standpoint of optimizing optical efficiency, a refractive index between 1.5 and 2.4 is desirable, and from the standpoint of minimizing reflectivity, a refractive index between 1.7 and 2.5 is desirable for the HAMR head 810. Accordingly, a refractive index of the second HRIM layer portion 814b that is between 1.5 and 2.5 (optimizing for either parameter), and more desirably between 1.7 and 2.4 (optimizing for both parameters), has practical application in the disclosed HAMR head 810 in reducing the amount of light reflected by the NFT 812 back to the laser diode, and at the same time maintaining a practical level of optical efficiency. Note that the range of the optimum refractive index may be changed when the wavelength of the laser or material of the NFT 812 is different, and the maximum refractive index may be between 2.5 and 4.0.

Figure 6E:
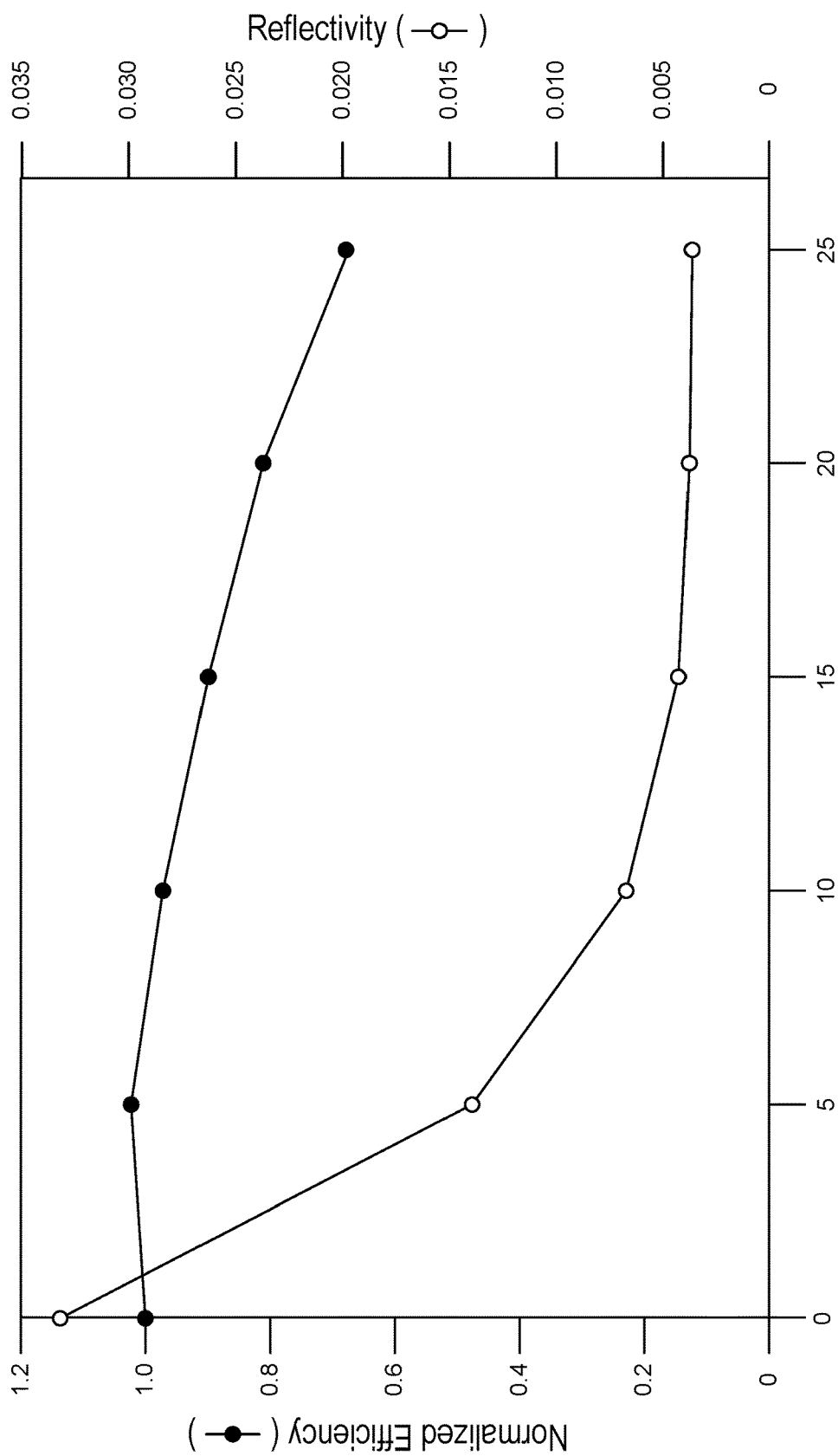
FIG. 6E is a plot illustrating the dependence of the normalized optical efficiency of the HAMR head on the thickness of the second HRIM layer portion according to the eighth embodiment of the present disclosure.

Referring to FIG. 6E, illustrated is a plot showing the dependence of the normalized optical efficiency of the HAMR head 810 on the thickness of the second HRIM layer portion 814b according to the eighth embodiment of the present disclosure. Although this plot reflects data for the eighth embodiment, it will be appreciated that similar plots for the normalized optical efficiency and reflectivity would be demonstrated for the NFT of the HAMR head in any embodiment in which the HRIM layer also covers the trailing side and cross-track facing surfaces of the output end of the NFT. As demonstrated by FIG. 6E, the reflectivity of the NFT 812 of the HAMR head 810 is inversely proportional to the thickness of the second HRIM layer portion 814b, while the normalized optical efficiency of the HAMR head 810 slightly increases with an increased thickness of the second HRIM layer portion 814b. Taking into account the physical robustness and optical efficiency of the NFT 812, a thickness of the second HRIM layer portion 814b from at least 5 nm up to at least 20 nm has practical application in the disclosed HAMR head 810 in reducing the amount of light reflected by the NFT 812 back to the laser diode.

Figure 6F:
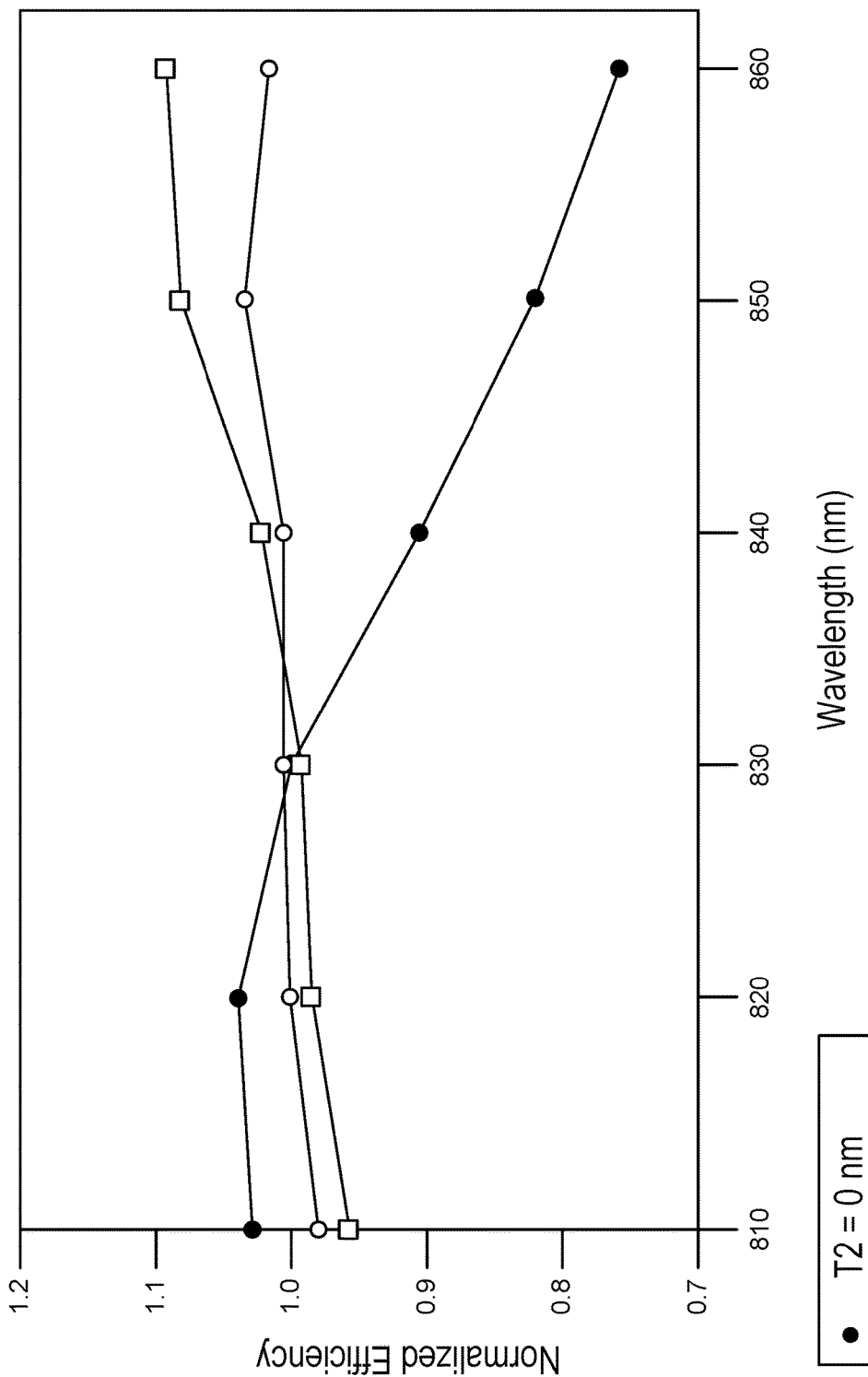
FIG. 6F is a plot illustrating the dependence of the normalized optical efficiency of the HAMR head on the laser wavelength and thickness of the second HRIM layer portion according to the eighth embodiment of the present disclosure.

Referring to FIG. 6F, illustrated is a plot showing the dependence of the normalized optical efficiency of the HAMR head 810 on the laser wavelength and thickness of the second HRIM layer portion 814b according to the eighth embodiment of the present disclosure. Although this plot reflects data for the eighth embodiment, it will be appreciated that similar plots for the normalized optical efficiency would be demonstrated for the NFT of the HAMR head in any embodiment in which the HRIM layer also covers the trailing side and cross-track facing surfaces of the output end of the NFT. As demonstrated in FIG. 6F, without a second HRIM layer portion on a trailing side of the output end of the NFT, the optical efficiency of the HAMR head decreases with increasing wavelength of the laser light. Since the laser wavelength routinely fluctuates within a wavelength range of 810 nm to 860 nm during operation as a function of ambient temperature, this means that such HAMR heads, including conventional HAMR heads, could experience decreases in the optical efficiency of as much as 20% due to wavelength fluctuations. The configuration of the second HRIM layer portion 814b on a trailing side of the output end 812a of the NFT 812 resolves this problem, so that the optical efficiency of the HAMR head 810 actually increases with an increase in the laser wavelength, and this effect is enhanced as the thickness of the second HRIM layer portion 814b is increased. In other words, the second HRIM layer portion 814b protects the optical efficiency of the HAMR head 810 from ambient temperature and laser wavelength fluctuations.

Figure 6G:
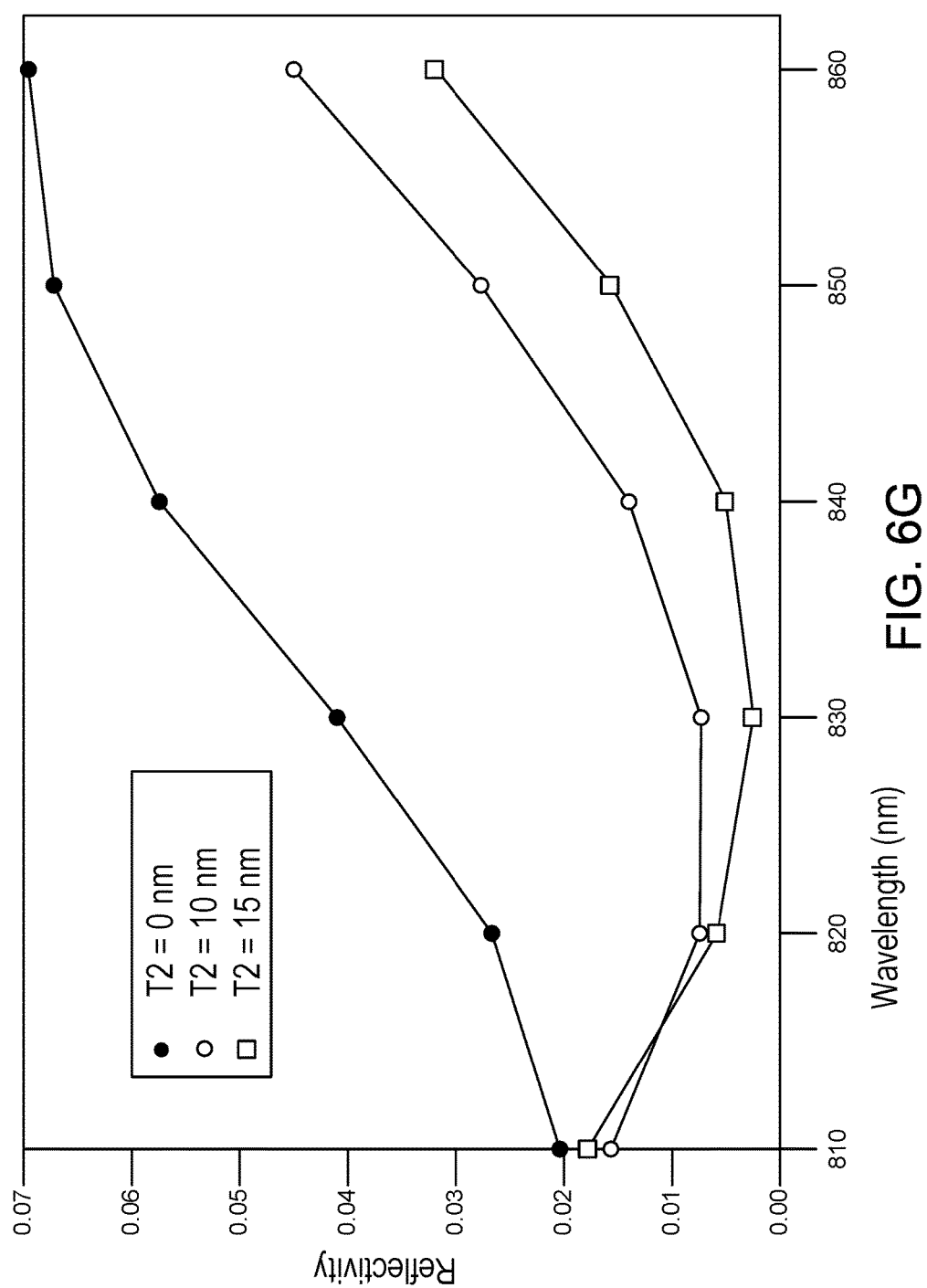
FIG. 6G is a plot illustrating the dependence of the reflectivity of the NFT of the HAMR head on the laser wavelength and thickness of the second HRIM layer portion according to the eighth embodiment of the present disclosure.

Referring to FIG. 6G, illustrated is a plot showing the dependence of the reflectivity of the NFT of the HAMR head on the laser wavelength and thickness of the second HRIM layer portion according to the eighth embodiment of the present disclosure. Although this plot reflects data for the eighth embodiment, it will be appreciated that similar plots for the reflectivity would be demonstrated for the NFT of the HAMR head in any embodiment in which the HRIM layer also covers the trailing side and cross-track facing surfaces of the output end of the NFT. As demonstrated in FIG. 6G, without a second HRIM layer portion on a trailing side of the output end of the NFT, the reflectivity of the NFT of the HAMR head increases with increasing wavelength of the laser light. Since the laser wavelength routinely fluctuates within a wavelength range of 810 nm to 860 nm during operation as a function of ambient temperature, this means that the NFT of such HAMR heads, including conventional HAMR heads, could experience almost a four-fold increase in the reflectivity of the NFT due to wavelength fluctuations. The configuration of the second HRIM layer portion 814b on a trailing side of the output end 812a of the NFT 812 resolves this problem, so that the reflectivity of the HAMR head 810 actually decreases with an increase in the laser wavelength between 810 nm and 830 nm, and the increase in reflectivity can still be suppressed as the laser wavelength increases from 830 nm to 860 nm. In other words, the second HRIM layer portion 814b protects the decrease in reflectivity of the NRT 812 from ambient temperature and laser wavelength fluctuations.

Referring to FIG. 6H, illustrated is a plot showing the dependence of the mean temperature rise of the HAMR head 810 on the down track position and configuration of the disclosed HRIM layer 814 according to the eighth embodiment of the present disclosure. Although this plot reflects data for the eighth embodiment, it will be appreciated that similar plots for the temperature distribution would be demonstrated for the NFT of the HAMR head in any embodiment in which the HRIM layer also covers the trailing side and cross-track facing surfaces of the output end of the NFT. Specifically, the plot shows how the temperature distribution of a HAMR head, provided with a NFT that has a refractive index (RI) of 1.5, can be advantageously moved toward the main magnetic pole 816 in the down-track direction (Z-direction) when a HRIM layer 814 with an RI of 2.1 is configured when the RI of the waveguide cladding layer 820 is 1.5. In this plot, the temperature distribution curve of the conventional HAMR head (no HRIM layer), illustrated by the dashed line to the left, is slightly shifted farther from the leading edge of the main magnetic pole 816 when compared to the temperature distribution curve of one embodiment of the HAMR head 810 (HRIM layer RI=2.1), illustrated by the solid line. Accordingly, the data transition point (corresponding to the optical near-field spot) of the disclosed HAMR head 810 (HRIM layer RI=2.1) is closer to the leading edge of the main magnetic pole 816 than the conventional HAMR head, and consequently exposed to a greater magnetic field intensity, which is illustrated by the dotted curve to the right in the Figure. This achieves the potential advantage of improving the recording efficiency of the main magnetic pole 816 of the disclosed HAMR head 810. Although FIG. 6H shows only one example of the disclosed HRIM layer 814 at one refractive index (RI=2.1), it will be appreciated that other refractive indices that are greater than the RI of the waveguide cladding 820 can achieve similar effects in shifting the temperature distribution of the HAMR head 810 in the down-track direction. It will also be noted that experimentation has also demonstrated that the temperature distribution of the HAMR head 810 in the cross-track direction is not substantially affected by the configuration of the disclosed HRIM layer 814.

Figure 7A:
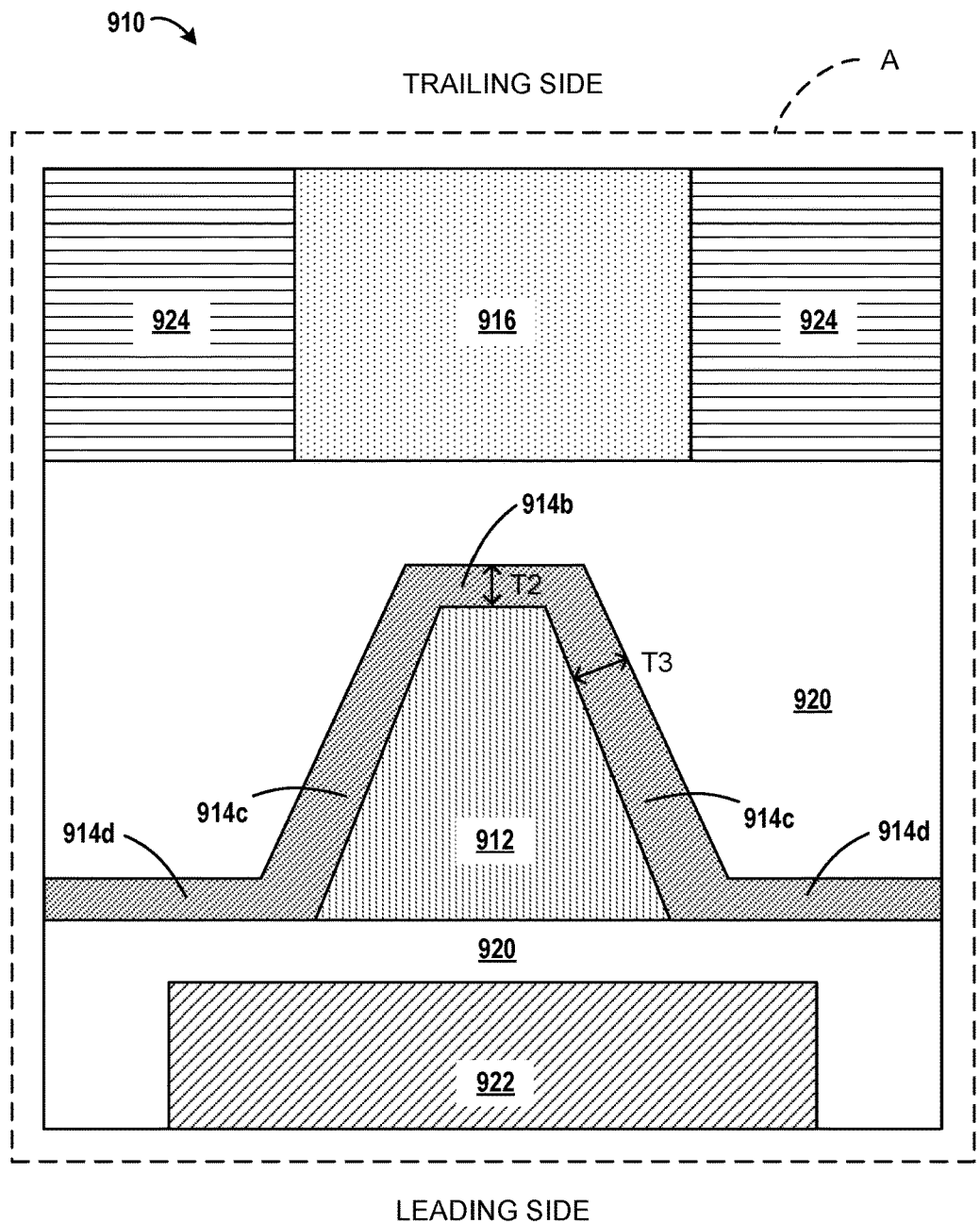
FIG. 7A is a cross-sectional view of the HAMR head according to a ninth embodiment of the present disclosure, taken along a line that corresponds to line A in FIG. 6A in the seventh embodiment.

Referring to FIG. 7A, a HAMR head 910 is shown according to the ninth embodiment of the present disclosure. Since the HAMR head 910 of the ninth embodiment is generally similar to that of the eighth embodiment with the exception of the configuration of the second and third uniform thicknesses of the HRIM layer 914, the detailed description thereof is abbreviated here for the sake of brevity. It is to be noted that like parts are designated by like reference numerals throughout the detailed description and the accompanying drawings. It will be noted that the FIG. 7A is a cross-sectional view of the HAMR head 910 taken along a line that corresponds to line A in FIG. 6A in the seventh embodiment, in which the first HRIM layer portion 914a is not visible. In this embodiment, the third uniform thickness T3 of the third HRIM layer portion 914c is greater than the second uniform thickness T2 of the second HRIM layer portion 914b, thereby reducing the reflectivity of the NFT 912 further.

Figure 7B:
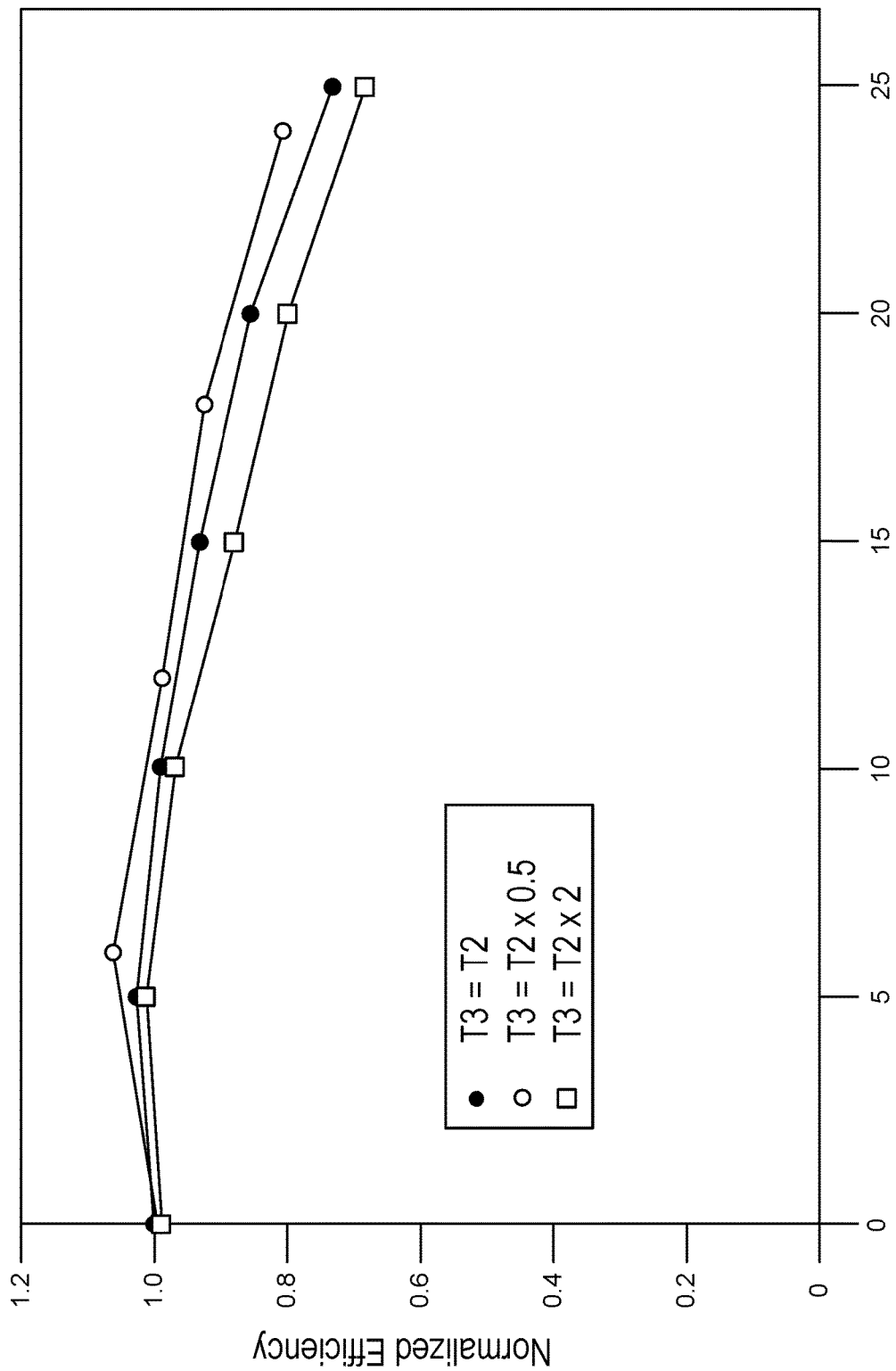
FIG. 7B is a plot illustrating the dependence of the normalized optical efficiency of the HAMR head on the thickness of the second HRIM layer portion and the ratio between the second HRIM layer portion thickness and the third HRIM layer portion thickness according to the ninth embodiment of the present disclosure.

Referring to FIG. 7B, illustrated is a plot showing the dependence of the normalized optical efficiency of the HAMR head on the thickness of the second HRIM layer portion 914b and the ratio between the second HRIM layer portion thickness and the third HRIM layer portion thickness according to the ninth embodiment of the present disclosure. As demonstrated by the plot, the normalized optical efficiency of the HAMR head 910 is minimally affected by changing the third uniform thickness of the third HRIM layer portion 914c.

Figure 7C:
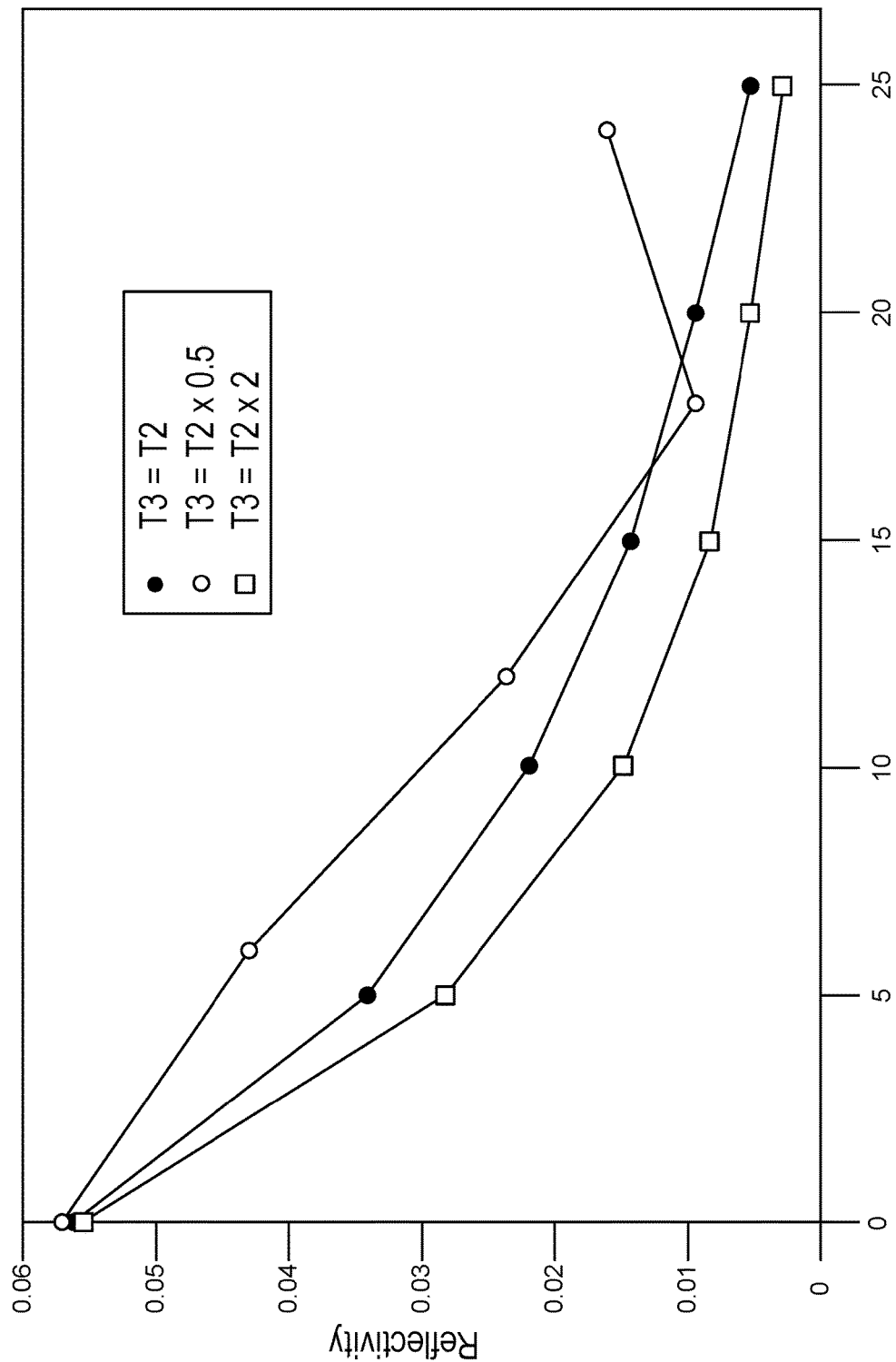
FIG. 7C is a plot illustrating the dependence of the reflectivity of the NFT of the HAMR head on the thickness of the second HRIM layer portion and the ratio between the second HRIM layer portion thickness and the third HRIM layer portion thickness according to the ninth embodiment of the present disclosure.

Referring to FIG. 7C, illustrated is a plot showing the dependence of the reflectivity of the NFT of the HAMR head on the thickness of the second HRIM layer portion 914b and the ratio between the second HRIM layer portion thickness and the third HRIM layer portion thickness according to the ninth embodiment of the present disclosure. As demonstrated by the plot, when the ratio between the second and third uniform thicknesses is controlled, the reflectivity of the NFT 912 is reduced when the third uniform thickness is controlled to be greater than the second uniform thickness, but increased when the third uniform thickness is controlled to be smaller than the second uniform thickness. Thus, it is demonstrated that configuring the third uniform thickness to be greater than the second uniform thickness has practical application in the disclosed HAMR head 910 in reducing the reflectivity of the NFT 912, thereby reducing the amount of light reflected by the NFT 912 back to the laser diode, while minimizing the decrease in the optical efficiency of the HAMR head 910.

Figure 7D:
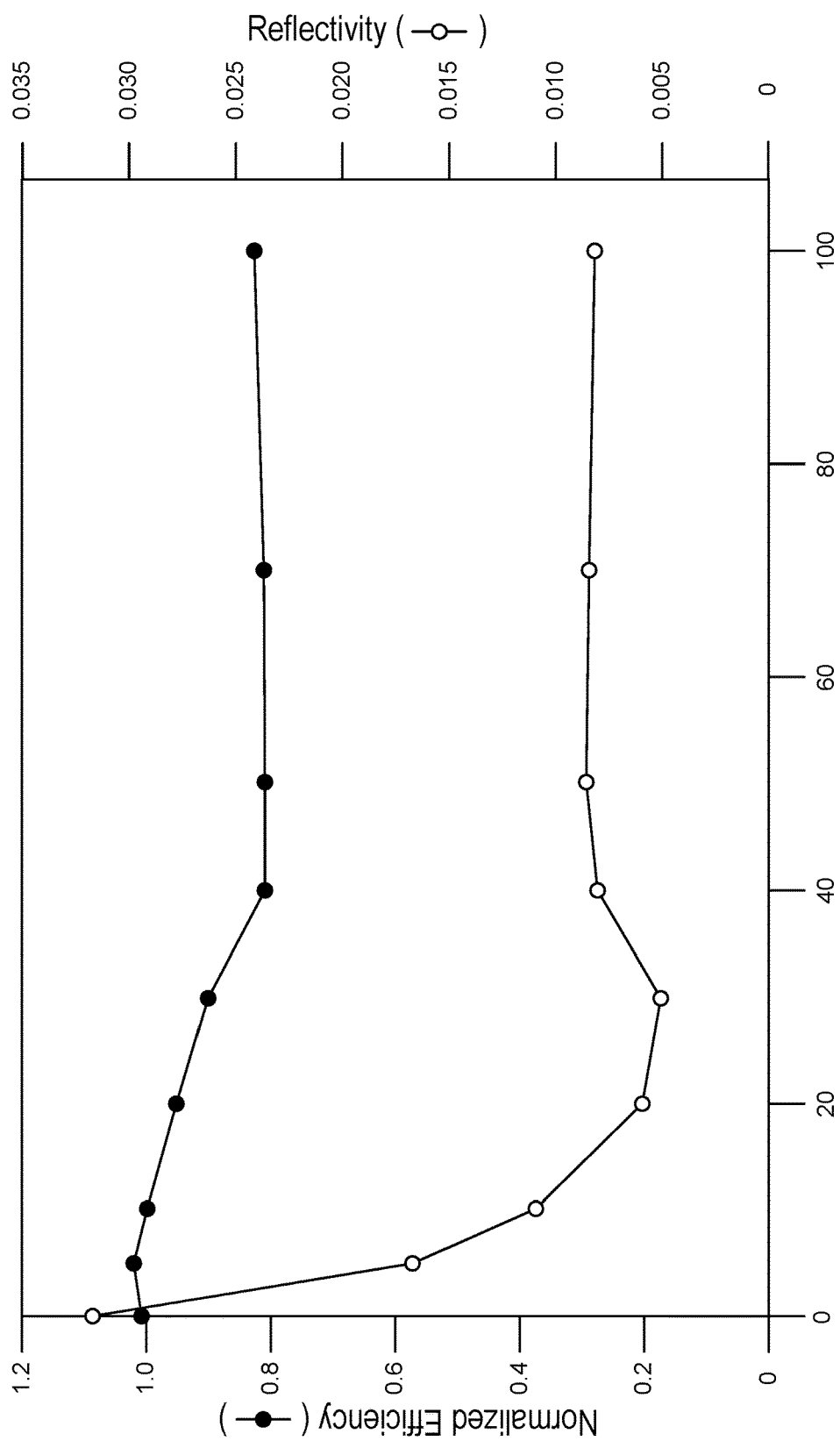
FIG. 7D is a plot illustrating the dependence of the normalized optical efficiency and reflectivity of the NFT of the HAMR head on the thickness of the third HRIM layer portion according to the ninth embodiment of the present disclosure.

Referring to FIG. 7D, illustrated is a plot showing the dependence of the normalized optical efficiency and reflectivity of the NFT 912 of the HAMR head 910 on the thickness of the third HRIM layer portion 914c according to another example of the ninth embodiment of the present disclosure, where the second HRIM layer portion uniform thickness is close to 0 nm. As shown in this plot, even in examples where there is a minimal HRIM layer portion on the trailing side of the NFT 912, the third HRIM layer portion 914c on the cross-track facing surfaces of the distal end 912a of the NFT 912 still reduces the reflectivity of the NFT 912 while minimizing the decrease of the optical efficiency of the HAMR head 910. Thus, it is demonstrated that configuring a third HRIM layer 914c with a minimal second HRIM layer 914b still has practical application in the disclosed HAMR head 910 in reducing the reflectivity of the NFT 912, thereby reducing the amount light reflected by the NFT 912 back to the laser diode, while minimizing the decrease in the optical efficiency of the HAMR head 910. Note that, alternatively, the thickness of the third HRIM layer 914c may be set close to zero with maintaining the second HRIM layer 914b instead of making the second layer HRIM portion uniform thickness close to 0. This structure, comprising a second HRIM layer 914b with a minimal third HRIM layer 914c, has a higher reflectivity of the NFT 912 compared to the structure with a third HRIM layer 914c and a minimal second HRIM layer 914b, but it is still beneficial for moving the data transition point toward the magnetic pole.

Figure 8A:
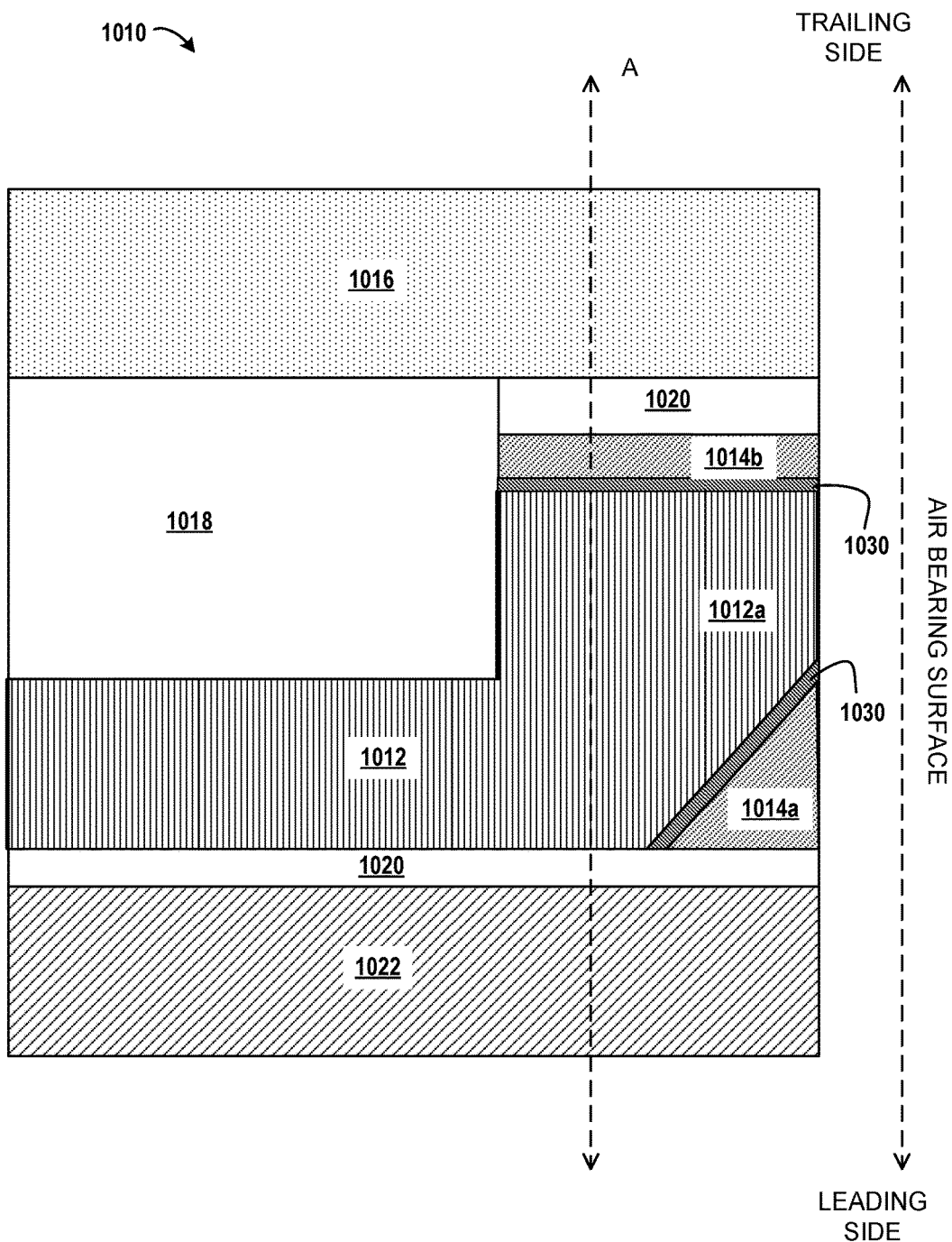
FIG. 8A is a cross-sectional view of the HAMR head according to a tenth embodiment of the present disclosure.
Figure 8B:
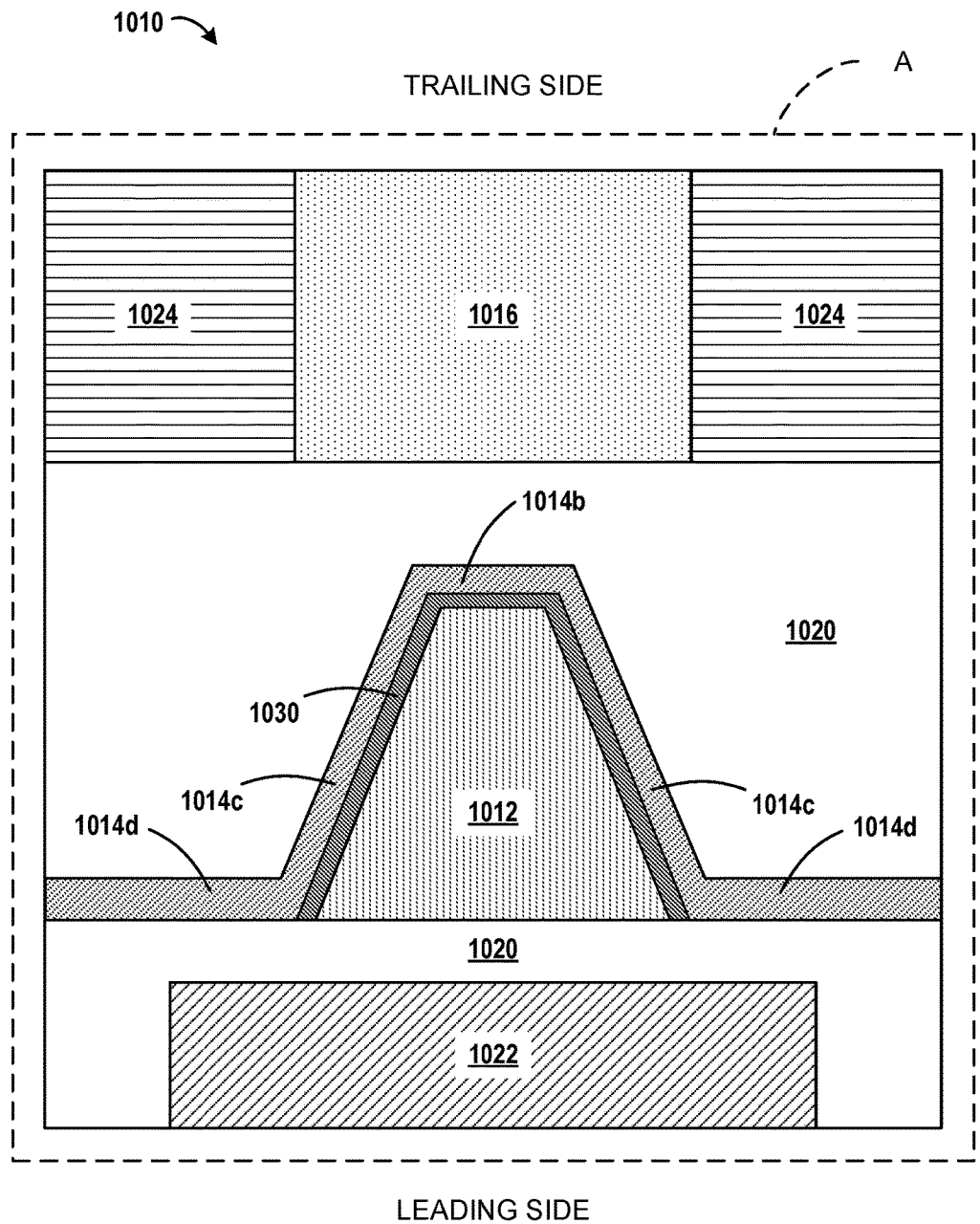
FIG. 8B is a cross-sectional view of the HAMR head according to the tenth embodiment of the present disclosure, taken along a line that corresponds to line A in FIG. 6A in the seventh embodiment.

Referring to FIGS. 8A-B, a HAMR head 1010 is shown according to the tenth embodiment of the present disclosure. Since the HAMR head 1010 of the tenth embodiment is generally similar to that of the eighth embodiment with the exception of the configuration of the adhesion layer 1030, the detailed description thereof is abbreviated here for the sake of brevity. It is to be noted that like parts are designated by like reference numerals throughout the detailed description and the accompanying drawings. It will be noted that the FIG. 8B is a cross-sectional view of the HAMR head 1010 taken along a line that corresponds to line A in FIG. 6A in the seventh embodiment, in which the first HRIM layer portion 1014a is not visible. In this embodiment, an adhesion layer 1030 is provided between the NFT 1012 and the second HRIM layer portion 1014b, and between the NFT 1012 and the third HRIM layer portion 1014c. The adhesion layer 1030 may comprise a material selected from a group consisting of Cr, NiCr, Ti, Ta, Hf, Nb and Zr. The adhesion layer 1030 may have a thickness between 0.5 and 1 nm. The adhesion layer 1030 achieves the potential advantage of increasing protection for the NFT 1012 and preventing deformation of NFT 1012 or delamination of the HRIM layer 1014 from the NFT 1012 during operation, especially under thermal and mechanical stresses. It will be appreciated that that adhesion layer may also be provided between the NFT and HRIM layer in the other embodiments, including the first through ninth embodiments of the present disclosure.

Figure 9A:
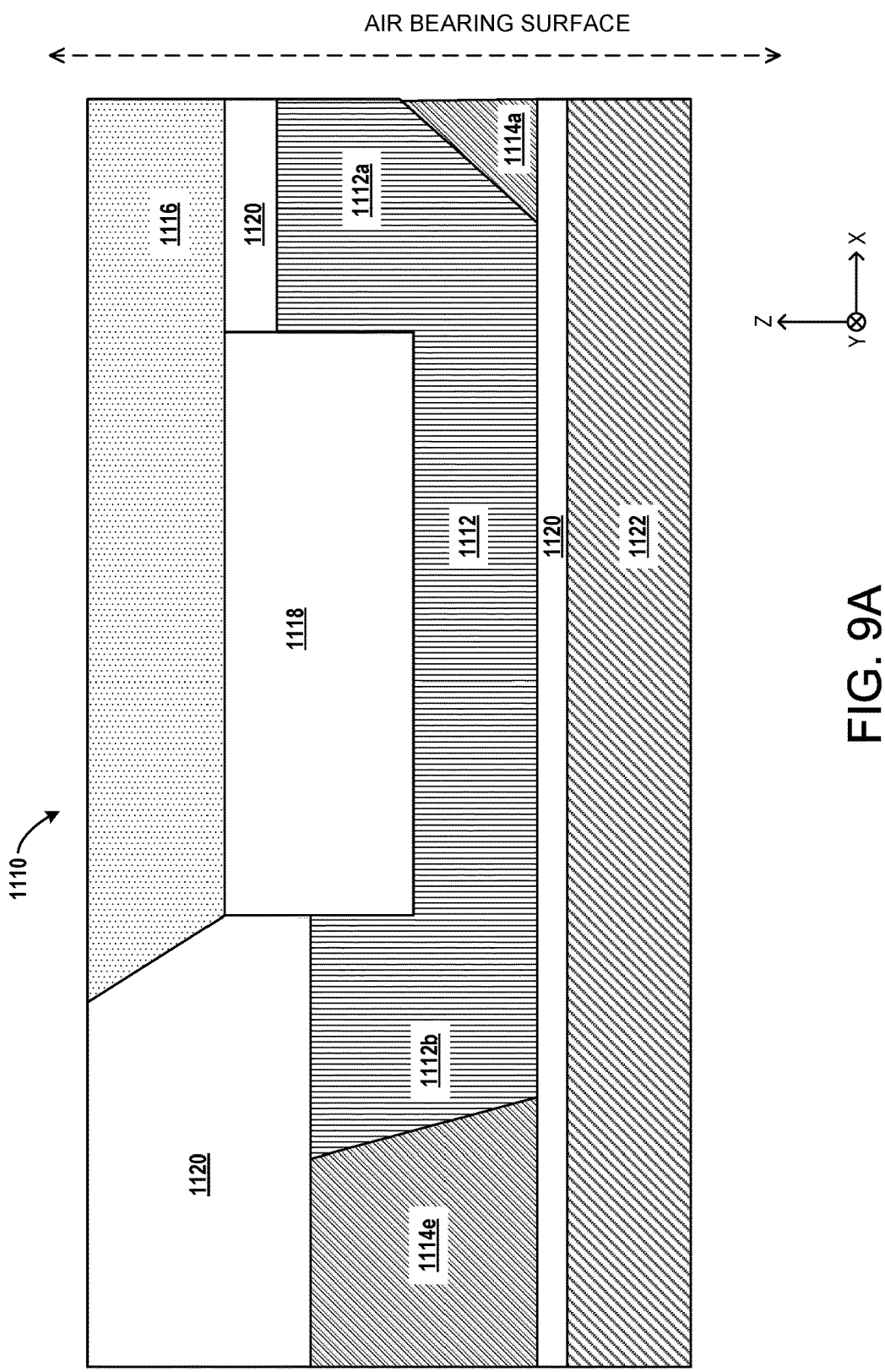
FIG. 9A is a cross-sectional view of the HAMR head according to an eleventh embodiment of the present disclosure.

Referring to FIG. 9A, a HAMR head 1110 is shown according to the eleventh embodiment of the present disclosure. Since the HAMR head 1110 of the eleventh embodiment is generally similar to that of the first embodiment with the exception of the configuration of the proximal HRIM layer portion 1114e, the detailed description thereof is abbreviated here for the sake of brevity. It is to be noted that like parts are designated by like reference numerals throughout the detailed description and the accompanying drawings. In this embodiment, the proximal HRIM layer portion 1114e is adjacent to a proximal end 1112b of the NFT 1112 in a height direction away from the ABS, and positioned between waveguide cladding layers 1120 on its trailing and leading sides. In combination with a first HRIM layer portion 1114a that is positioned on the leading side taper of the NFT 1112, the proximal HRIM layer portion 1114e is configured to reduce the amount of light that is reflected by the proximal end 1112b of the NFT 12 back to the laser diode, thereby increasing recording precision and accuracy. The proximal HRIM layer portion 1114e also helps decrease the temperature of the NFT 1112 by absorbing excess heat in the proximal end 1112b of the NFT 1112, thereby reducing the risk of possible thermal damage to the NFT 1112. It will be appreciated that that proximal HRIM layer portion may also be provided adjacent to the proximal end of the NFT in the other embodiments, including the first through tenth embodiments of the present disclosure.

Figure 9B:
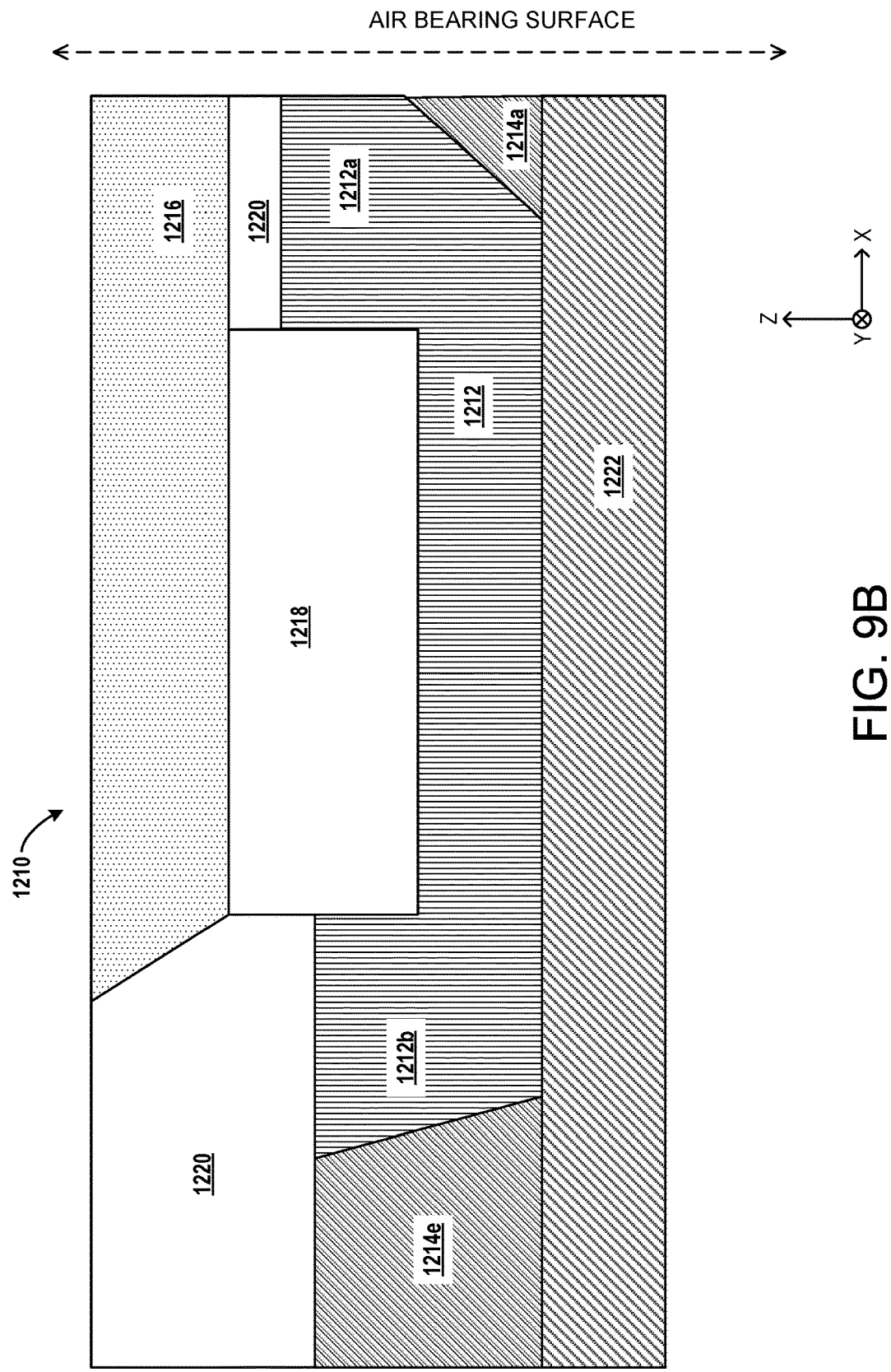
FIG. 9B is a cross-sectional view of the HAMR head according to a twelfth embodiment of the present disclosure.

Referring to FIG. 9B, a HAMR head 1210 is shown according to the twelfth embodiment of the present disclosure. Since the HAMR head 1210 of the twelfth embodiment is generally similar to that of the eleventh embodiment with the exception of the configuration of the proximal HRIM layer portion 1214e and the omission of the waveguide cladding layer on a leading side of the NFT, the detailed description thereof is abbreviated here for the sake of brevity. It is to be noted that like parts are designated by like reference numerals throughout the detailed description and the accompanying drawings. In the twelfth embodiment, the waveguide cladding layer between the waveguide core layer 1222 and NFT 1212 is omitted. Although this may decrease the optical efficiency of the NFT 1212, this also achieves the potential advantage of simplifying the fabrication process of the HAMR head 1210. It will be appreciated that that the waveguide cladding layer between the waveguide core layer and the NFT may also be omitted in the other embodiments, including the first through tenth embodiments of the present disclosure.

Figure 9C:
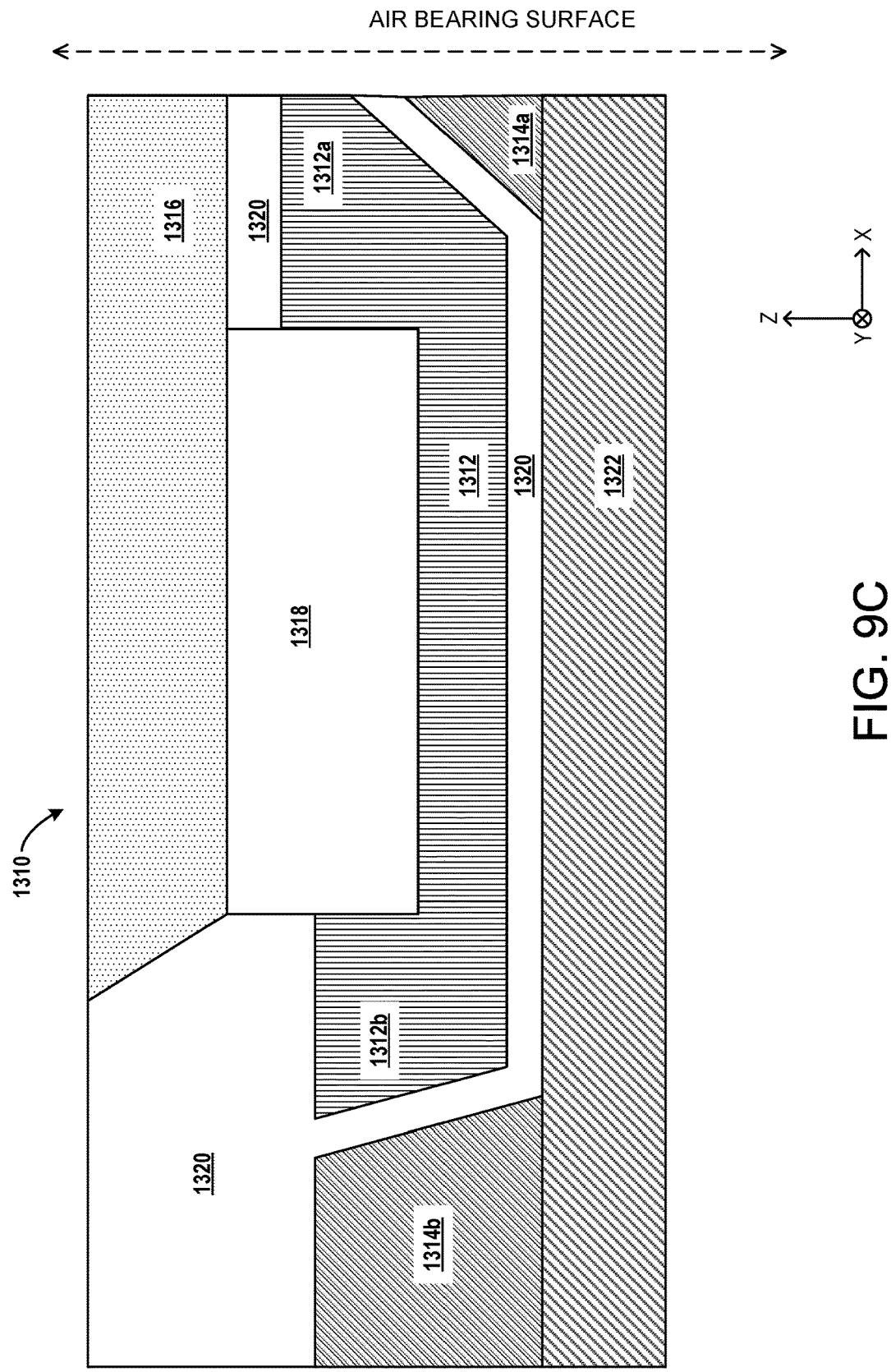
FIG. 9C is a cross-sectional view of the HAMR head according to a thirteenth embodiment of the present disclosure.

Referring to FIG. 9C, a HAMR head 1310 is shown according to the thirteenth embodiment of the present disclosure. Since the HAMR head 1310 of the thirteenth embodiment is generally similar to that of the eleventh embodiment with the exception of the configuration of the waveguide cladding layer 1320 on a leading side of the NFT, the detailed description thereof is abbreviated here for the sake of brevity. It is to be noted that like parts are designated by like reference numerals throughout the detailed description and the accompanying drawings. In the thirteenth embodiment, the waveguide cladding layer 1320 is configured on a trailing side and leading side of the NFT 1312 so as to surround the proximal end 1312b and the distal end 1312a, insulating the distal end 1312a from the first HRIM layer portion 1314a, the waveguide core layer 1322, and the main pole 1316, and insulating the proximal end 1312b from the proximal HRIM layer portion 1314e and waveguide core layer 1322. This achieves the potential advantage of further reducing the amount of light that is reflected by the proximal end 1312b and distal end 1312a of the NFT 1312 back to the laser diode, thereby increasing recording precision and accuracy. It will be appreciated that that this configuration of the waveguide cladding layer around the NFT may also be applied in the other embodiments, including the fourth through sixth embodiments of the present disclosure. It will also be appreciated that an adhesion layer may also be provided between the NFT and HRIM layer in the eleventh through thirteenth embodiments of the present disclosure.

According to the present disclosure as described above, embodiments of a HAMR head are provided to maintain or increase the optical efficiency of the HAMR head and reduce the reflectivity of the NFT of the HAMR head. Embodiments have also been described that increase the robustness of the NFT, decrease the temperature of the NFT, increase the magnetic field intensity at the data transition point, reduce adjacent track interference, and protect the HAMR head from increases in NFT reflectivity due to NFT temperature and laser wavelength fluctuations. As a result, the amount of light that is reflected by the NFT back to the laser diode is reduced, thereby increasing recording precision and accuracy compared to conventional HAMR heads.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A heat assisted magnetic recording (HAMR) head, comprising:
   a leading side, a trailing side, and an air bearing surface (ABS);
   a near field transducer (NFT) disposed in the head and having a distal end with a leading side taper inclined at an acute angle to the ABS, such that an acute angle is formed between a leading surface of the leading side taper and the ABS;
   a main magnetic pole disposed in the head facing a trailing side of the NFT;
   a waveguide core layer disposed in the head facing the leading side taper of the NFT;
   a waveguide cladding layer disposed in the head between the NFT and the waveguide core layer;
   a high refractive index material (HRIM) layer disposed in the head on the leading side taper of the NFT and having a refractive index that is higher than a refractive index of the waveguide cladding layer; and
   an adhesion layer between the NFT and the HRIM layer.

2. The HAMR head of claim 1, wherein
   a refractive index of the HRIM layer is between 1.7 and 2.7.

3. The HAMR head of claim 1, wherein
   the HRIM layer comprises a material selected from a group consisting of $Ta_2O_5$, $TiO_2$, $Cr_2O_3$, $ZrO_2$, $HfO_2$, BeO, $Dy_2O_3$, $GeO_2$, $Lu_2O_3$, MgO, $MoO_3$, $Nb_2O_3$, $Sc_2O_3$, $TeO_2$, $Y_2O_3$, $Yb_2O_3$, ZnO, $In_2O_3$, $SnO_2$, ITO (Indium tin oxide), $ZnO_2$, TNO ($Ti_{1-x}Nb_xO2$), IZO (Indium zinc oxide), ATO (Sb-doped tin oxide), $SrTiO_3$, CdO, $InSbO_4$, $Cd_2SnO_4$, $Zn_2SnO_4$, $LiNbO_3$, $KNbO_3$, SiN, TiN, AlN, GaN, SiC, GaP and Si.

4. The HAMR head of claim 1, wherein
   a width of the HRIM layer in a cross-track direction of the head is greater than a maximum width of the NFT in the cross-track direction of the head.

5. The HAMR head of claim 1, wherein
   a width of the HRIM layer in a cross-track direction of the head is substantially similar to a width of the NFT in the cross-track direction of the head.

6. The HAMR head of claim 1, wherein
   the HRIM layer has a substantially uniform first thickness extending in a direction normal to the leading surface of the leading side taper.

7. The HAMR head of claim 6, wherein
   the first thickness is at least 5 nm.

8. The HAMR head of claim 1, wherein
   the HRIM layer substantially occupies a space between the leading surface of the leading side taper and the ABS.

9. The HAMR head of claim 8, wherein
   the HRIM layer extends in a leading side direction so as to embed the HRIM layer within the waveguide core layer from a trailing side of the waveguide core layer.

10. The HAMR head of claim 8, wherein
    the HRIM layer extends in a leading side direction and contacts a trailing side surface of the waveguide core layer.

11. The HAMR head of claim 10, wherein
the HRIM layer extends between 30 nm and 500 nm along a length of the waveguide core layer and NFT in a direction substantially perpendicular to the ABS.

12. A heat assisted magnetic recording (HAMR) head, comprising:
a leading side, a trailing side, and an ABS;
a NFT disposed in the head and having a distal end with a trailing side surface, leading side surface, and cross-track facing surfaces;
a main magnetic pole disposed in the head facing the trailing side of the NFT;
a waveguide core layer disposed in the head facing the leading side surface of the NFT;
a waveguide cladding layer disposed in the head between the NFT and the waveguide core layer; and
a high refractive index material (HRIM) disposed in the head and having a refractive index that is higher than a refractive index of the waveguide cladding layer, the HRIM comprising a first portion in contact with and extending normal to the trailing side surface of the distal end of the NFT and a second portion in contact with and extending normal to at least one surface of the NFT that intersects with the trailing side surface;
wherein a width of the HRIM in a cross-track direction of the head is greater than a maximum width of the NFT in the cross-track direction of the head.

13. The HAMR head of claim 12, wherein
a refractive index of the HRIM is between 1.5 and 2.5.

14. The HAMR head of claim 12, wherein
the HRIM comprises a material selected from a group consisting of $Ta_2O_5$, $TiO_2$, $Cr_2O_3$, $ZrO_2$, $HfO_2$, BeO, $Dy_2O_3$, $GeO_2$, $Lu_2O_3$, MgO, $MoO_3$, $Nb_2O_3$, $Sc_2O_3$, $TeO_2$, $Y_2O_3$, $Yb_2O_3$, ZnO, $In_2O_3$, $SnO_2$, ITO (Indium tin oxide), $ZnO_2$, TNO ($Ti_{1-x}Nb_xO2$), IZO (Indium zinc oxide), ATO (Sb-doped tin oxide), $SrTiO_3$, CdO, $InSbO_4$, $Cd_2SnO_4$, $Zn_2SnO_4$, $LiNbO_3$, $KNbO_3$, SiN, TiN, AlN, GaN, SiC, GaP and Si.

15. The HAMR head of claim 12, wherein
the first portion of the HRIM forms a first uniform thickness covering the trailing side surface of the distal end of the NFT and the second portion of the HRIM forms a second uniform thickness covering at least a portion of the at least one surface of the NFT that intersects with the trailing side surface.

16. The HAMR head of claim 15, wherein
the first uniform thickness is between 5 nm and 20 nm.

17. The HAMR head of claim 12, further comprising:
an adhesion layer between the NFT and the first portion of the HRIM and between the NFT and the second portion of the HRIM.

18. The HAMR head of claim 17, wherein
the adhesion layer comprises a material selected from a group consisting of Cr, NiCr, Ti, Ta, Hf, Nb and Zr.

19. The HAMR head of claim 17, wherein
the adhesion layer has a thickness between 0.5 nm and 1 nm.

20. The HAMR head of claim 15, wherein
the second uniform thickness is greater than the first uniform thickness.

21. A heat assisted magnetic recording (HAMR) head, comprising:
a leading side, a trailing side, and an air bearing surface (ABS);
a near field transducer (NFT) disposed in the head and having a distal end with a leading side taper inclined at an acute angle to the ABS, such that an acute angle is formed between a leading surface of the leading side taper and the ABS;
a main magnetic pole disposed in the head facing a trailing side of the NFT;
a waveguide core layer disposed in the head facing the leading side taper of the NFT;
a waveguide cladding layer disposed in the head between the NFT and the waveguide core layer; and
a high refractive index material (HRIM) layer disposed in the head on the leading side taper of the NFT and having a refractive index that is higher than a refractive index of the waveguide cladding layer;
wherein a width of the HRIM layer in a cross-track direction of the head is greater than a maximum width of the NFT at the leading surface of the leading side taper in the cross-track direction of the head.

22. A heat assisted magnetic recording (HAMR) head, comprising:
a leading side, a trailing side, and an ABS;
a NFT disposed in the head and having a distal end with a trailing side surface, leading side surface, and cross-track facing surfaces;
a main magnetic pole disposed in the head facing the trailing side of the NFT;
a waveguide core layer disposed in the head facing the leading side surface of the NFT;
a waveguide cladding layer disposed in the head between the NFT and the waveguide core layer;
a high refractive index material (HRIM) disposed in the head and having a refractive index that is higher than a refractive index of the waveguide cladding layer, the HRIM comprising a first portion in contact with and extending normal to the trailing side surface of the distal end of the NFT and a second portion in contact with and extending normal to at least one surface of the NFT that intersects with the trailing side surface; and
an adhesion layer between the NFT and the first portion of the HRIM and between the NFT and the second portion of the HRIM.

23. A hard disk drive comprising the HAMR head of claim 1.

24. A hard disk drive comprising the HAMR head of claim 12.

* * * * *